United States Patent

[11] 3,611,300

[72] Inventors Richard W. Aldrich
Liverpool;
Robert D. Berlin, Syracuse, N.Y.; Panos
Galldas, Alexandria, Va.
[21] Appl. No. 530,045
[22] Filed Feb. 25, 1966
[45] Patented Oct. 5, 1971
[73] Assignee Honeywell Information Systems Inc.

[54] MULTICOMPUTER SYSTEM FOR REAL-TIME ENVIRONMENT
8 Claims, 7 Drawing Figs.

[52] U.S. Cl. 340/172.5
[51] Int. Cl. G06f 15/16
[50] Field of Search 340/172.5; 235/157

[56] References Cited

UNITED STATES PATENTS

| | | | |
|---|---|---|---|
| 3,251,040 | 5/1966 | Burkholder et al. | 340/172.5 |
| 3,263,219 | 7/1966 | Brun et al. | 340/172.5 |
| 3,266,023 | 8/1966 | Werme | 340/172.5 |
| 3,312,953 | 4/1967 | Wang et al. | 340/172.5 |
| 3,312,954 | 4/1967 | Bible et al. | 340/172.5 |
| 3,323,109 | 5/1967 | Hecht et al. | 340/172.5 |

*Primary Examiner*—Raulfe B. Zache
*Attorneys*—Fred Jacob and Edward W. Hughes

ABSTRACT: A data-processing system comprising two (or more) data processors the first of which performs main processing operations on incoming data while generating instructions that enable a second (or subsequent) data processor to simultaneously perform certain auxiliary processing operations necessary for the completion of the main processing operations.

INVENTOR.
R.W. ALDRICH
R.D. BERLIN
P. GALIDAS

BY

ATTORNEY

MAIN COMPUTER

AUXILIARY COMPUTER

MULTICOMPUTER SYSTEM FOR REAL-TIME ENVIRONMENT

This invention relates to data-processing systems and more particularly to multicomputer data-processing systems wherein a plurality of data processors jointly and simultaneously process data.

A data-processing system comprises a data processor, a data storage unit, and a plurality of input/output devices. The data processor processes data by executing different programs. The data storage unit stores data to be processed, data which is the result of processing and programs for controlling the processing operations of the data processor. The input/output devices supply programs and data to be processed, and transmit or utilize processed data. Each program employed by a data-processing system comprises a series of instructions for controlling the data processor to execute in sequence the individual steps necessary to perform a particular data-processing operation.

In one mode of employment certain equipment external to the data-processing system operates under the immediate and direct control of the data-processing system. In this mode the data-processing system receives through an input/output device data characteristic of the current state of operation of the external equipment, and in response to this received data the data-processing system transmits through the input/output device control data for directing the operation of the equipment. If the state of the external equipment is subject to rapid changes, such as the attitude and speed of an aircraft, missile or space vehicle in flight, the data-processing system must rapidly respond to and process immediately the received state data and must expeditiously deliver the corresponding control data. This mode of data processing, wherein the input data represents the state of certain external equipment at the time of receipt and the output data is employed to control the operation of the equipment at the time the output data is generated is termed "real-time processing."

When a data-processing system is to perform real-time processing, it must accept, process, and transmit data at rates determined by the external equipment, otherwise the required data is not received when needed by the external equipment or in time to maintain the equipment within acceptable operating limits. Moreover, when a data-processing system performs real-time processing simultaneously for a plurality of different external equipments, it must accept state data, process the state data, and transmit control data at rates sufficiently rapid to maintain proper and required operations for all of these equipments.

In addition to the requirement that a data-processing system operating in a real-time environment perform the direct tasks of accepting and processing state data and of transmitting control data at rates determined by the external equipments, there exists another requirement that the system perform data-processing tasks ancillary to the direct tasks. For example, in addition to generating and transmitting control data at the requisite real-time rate, the data-processing system must be capable of verifying the validity and correctness of this control data. Moreover, the system must maintain a stored file of the characteristics and the latest control status of the external equipments being serviced and be capable of employing this stored file in providing the control data. Accordingly, a data-processing system must be provided for not only satisfying the immediate and direct real-time data-processing and control requirements for servicing a plurality of real-time equipments, but for expeditiously maintaining the related ancillary data processing tasks.

Therefore, it is the principal object of this invention to provide an improved data processing system for efficiently satisfying the data processing requirements of real-time environment.

Another object of this invention is to provide an improved data-processing system for efficiently satisfying the data-processing requirements of a plurality of external equipments in a real-time environment.

Another object of this invention is to provide an improved data-processing system for efficiently performing the immediate and direct data-processing tasks of a real-time environment and effectively maintaining the ancillary data processing tasks.

The foregoing objects are achieved, according to the instant invention, by providing a novel multicomputer system for satisfying the data processing requirements of a real-time environment. A multicomputer system is a data-processing system comprising a plurality of data processors, in addition to at least one data storage unit and at least one input/output device. The plural data processors process data by executing separate programs simultaneously. In the instant invention, a first of these data processors has the primary function of accepting and responding to the state data received from each of the real-time equipments, of processing the state data to provide control data, and of delivering the control data for transmittal by an input/output device to the real-time equipments. A second of the data processors has the primary function of performing the ancillary data-processing tasks necessary to support the primary function of the first processor. For coordinating the operation of the complete multicomputer system, the first processor generates program instructions to control the second processor to perform the ancillary operations. The first processor transmits these generated instructions and the processed data from which the control data is derived to the second processor. The second processor thereupon executes the instructions received from the first processor to perform corresponding ancillary data-processing operations on the data received from the first processor.

In response to one of these received instructions the second processor determines whether a portion of the data supplied by the first processor satisfies certain criteria, and modifies this data if the criteria are not satisfied.

In response to another of these received instructions the second processor determines whether another portion of the data provided by the first processor satisfies certain other criteria, and notifies the first processor if these other criteria are not satisfied. In this latter instance, the first processor responds to the notification to provide a modified set of data in a further effort to satisfy the criteria.

Accordingly, by providing one processor for primarily performing the immediate and direct data-processing tasks of the real-time environment, by providing another processor for primarily performing the ancillary data-processing tasks for supporting the immediate and direct tasks, and by providing the processor performing the immediate and direct tasks with the capability of determining and controlling the ancillary tasks performed by the other processor, an improved and efficient data-processing system for operating in a real-time environment is implemented.

This invention will be described with reference to the accompanying drawings, wherein.

One type of real-time environment to which the instant invention is applicable will now be described to aid in the subsequent explanation of the operation of the invention. This real-time environment includes an aircraft carrier and a number of aircraft returning to the carrier from different points at different headings, altitudes and speeds. The real-time control system for this environment repeatedly receives data defining the current location of each aircraft and in response to this data generates and transmits control data for each aircraft. Each aircraft continuously responds to the repetitive control data provided therefor to follow a unique and safe prescribed course to the aircraft carrier so as to arrive at the carrier at a unique prescribed time.

Figure 1:
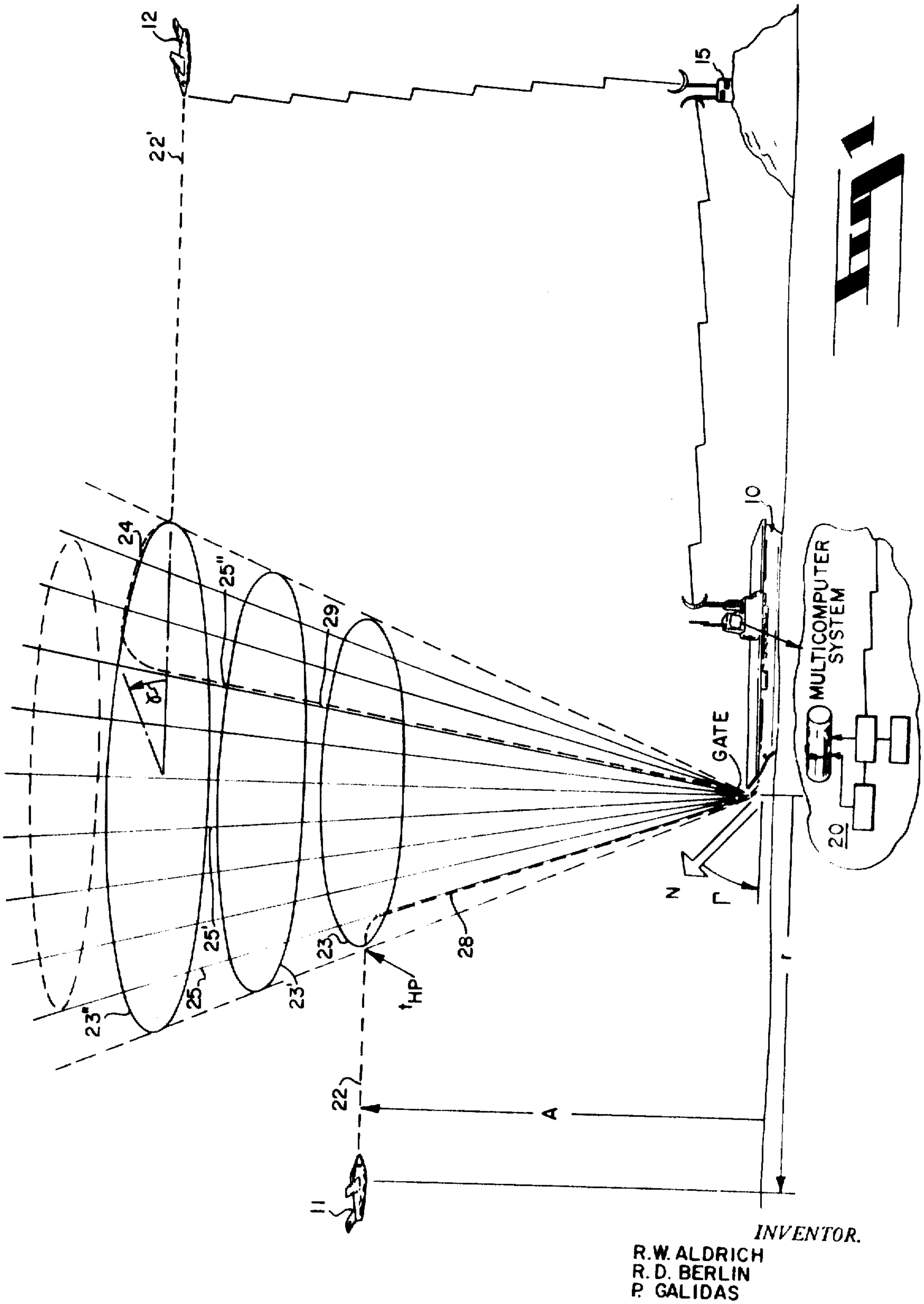
FIG. 1 is a diagram of the real-time environment for which the instant invention satisfies the data-processing requirements.

The real-time environment of FIG. 1 comprises an aircraft carrier 10, which may be powered by either conventional or nuclear means, and a plurality of aircraft assigned to carrier 10, such as aircrafts 11 and 12. These aircraft may be powered by any means, such as by propeller or jet. An Aircraft Communicator 15, located on land, an anchored platform, or a ship, communicates by radio and radar with the aircraft of carrier 10 and particularly with all such aircraft returning to carrier 10. Aircraft Communicator 15 determines the positions of the aircraft by radar, determines the identity of each aircraft by transponder radio, and transmits data relating to each aircraft to carrier 10 by radio. Additionally, Aircraft Communicator 15 relays control information transmitted by carrier 10 to each aircraft by radio. The real-time control system providing the data-processing requirements of the environment of FIG. 1 is on board aircraft carrier 10, and comprises the Multicomputer System 20 of the instant invention. In the instant embodiment, Multicomputer System 20 functions to provide real-time control for approximately 100 aircraft returning to carrier 10 by accepting the data transmitted by Communicator 15 to carrier 10, by processing this data to generate control data, and by providing the control data for transmission by carrier 10 to Communicator 15.

Initial control over an aircraft returning to carrier 10 is asserted by the control system when the aircraft approaches to within 200 miles of the carrier. At this time, and at rapidly recurring intervals thereafter, Aircraft Communicator 15 transmits data relating to this aircraft to Multicomputer System 20. The data transmitted comprises an aircraft identifier and current position data. The aircraft identifier, which may be a number, is unique for each aircraft and is received by Communicator 15 from a transponder radio in the aircraft. The position data, which includes relative altitude, range and bearing of the aircraft is received by Communicator 15 from an associated radar. Additional data may also be transmitted at this time, such as information denoting that the aircraft has priority in its approach, that no previous data has been transmitted with respect to this aircraft in its present approach, etc.

Multicomputer System 20 immediately accepts and processes the data provided by Communicator 15, using data stored internal thereto which relates to the aircraft characteristics and history, and using information manually inserted into system, such as wind speed and direction. The processing results of System 20 include control data for directing the aircraft. The control data generated includes heading, air speed, and altitude for each aircraft. The control data may also include special information; such as an instruction to make a right or left turn, an indication that the control data is significantly different from or substantially the same as the last control data generated for the same aircraft, etc. This control data and the corresponding aircraft identifier are transmitted to Communicator 15 and relayed thereby to the aircraft. Each aircraft flies the course denoted by the received control data until it arrives at the carrier.

The control data prescribes a course for an aircraft by specifying aircraft heading, air speed and altitude. The altitude specified by System 20 is one of 26 discrete levels in the range of 4,000 to 40,000 feet. These allowable altitudes are spaced at intervals of 800 feet at the lower levels, and the intervals increase to 4,000 at the higher levels. For example, at the lower levels altitudes of 4,000, 4,800 or 5,600 feet may be assigned, whereas at the higher levels 32,000, 36,000, or 40,000 feet may be assigned. The initial altitude assigned by System 10 to a particular aircraft is usually the allowable altitude closest to the level at which the aircraft is flying when it is first acquired; however, if the aircraft is initially flying above 40,000 feet, it is first ordered to an altitude of 40,000 feet.

The initial heading assigned to an aircraft enables the aircraft to fly on one of 64 discrete radial paths, such as radial paths 22 and 22', toward the carrier at the assigned altitude. There are 64 allowable radial paths, uniformly spaced apart by intervals of 5.625° at each allowable altitude. The optimum speed for the aircraft, stored internally to the Multicomputer System, is assigned to the aircraft for flying along the initially assigned radial path.

Each of the radial paths initially assignable to an aircraft by System 20 intersects one of a set of circular holding paths 23, 23', 23'', the intersected holding path being at the same altitude as the intersecting radial path. The lowest of the 26 holding paths, at the altitude of 4,000 feet, has a radius of 23 miles, the radii of the holding paths increasing uniformly with altitude to a maximum radius of 95 miles at the altitude of 40,000 feet. Accordingly, the holding paths define a hypothetical inverted truncated cone termed the "holding path cone."

If a conflict in arrival times at the carrier would occur for two or more aircraft flying their respective initially prescribed courses at the prescribed optimum speeds, all but one of such aircraft will be directed to turn onto and fly along the holding path cone when the cone is reached. An aircraft is directed to continue along a holding path only so long as is required to resolve the arrival time conflict and enable each aircraft to arrive for a landing at carrier 10 at a unique interval. For example, as shown in FIG. 1, aircraft 12 is directed to turn onto and fly along holding path 23''. The altitude of holding path 23'' is the same as that of the radial path 22', along which aircraft 12 is flying when it reaches the holding path cone. Aircraft 12 flies along an arc 24 of holding path 23'' only so long as is required to prevent aircraft 12 from arriving at carrier 10 at a time conflicting with the arrival of another aircraft.

On the holding path cone jet-propelled aircraft are assigned speeds of 240 knots, whereas propeller driven aircraft are assigned speeds of 200 knots.

Each of the radial paths initially assignable to an aircraft by System 20 also intersects one of a set of linear inclined descent paths 25, 25', 25'', the intersected descent path being at the same azimuth relative to the carrier as the intersecting radial path. Each descent path commences immediately inside the holding path at 40,000 feet and terminates at a level of 500 feet and an area within 5 miles of the carrier. Accordingly, the 64 descent paths define a hypothetical inverted cone termed a "descent cone." The truncated lower end of the descent cone, at the 500 feet level and approximately 5 miles from the carrier, is termed the "gate." The gate is the location at which an aircraft is released by the control system to land on the carrier.

If an aircraft is involved in no conflict of arrival time with another aircraft, it will fly along its originally prescribed radial path, through the holding path cone, and onto a descent path. The aircraft thereupon descends along the descent path to an altitude of approximately 500 feet, the gate location. At the gate the aircraft is approximately 5 miles from the carrier, whereupon the aircraft is released by the control system to make its own final approach and landing. For example, as shown in FIG. 1, aircraft 11 flies along radial path 22, through the holding path cone, and onto the corresponding descent path 25. Aircraft 11 thereupon makes its descent 28 along descent path 25, utilizing the same heading as when it was approaching along radial path 22.

An aircraft is released from the holding path cone to make a 90° left turn and then descend along a descent path. For example, when aircraft 12 is released from flying along arc 24 of holding path 23'' it executes a 90° left turn and then flies onto a descent path 25''. Aircraft 12 thereupon makes its descent 29 along descent path 25''.

On the descent cone, aircraft are assigned descent rates of 4,000 feet per minute and air speeds of 240 knots above the level of 10,000 feet and are assigned descent rates of 2,000 feet per minute and air speeds of 200 knots below the level of 10,000 feet.

Accordingly, the Multicomputer System 29 of the instant invention controls a plurality of aircraft of different types to fly respective unique and safe courses to arrive at an aircraft carrier at respective unique times.

Figure 2:
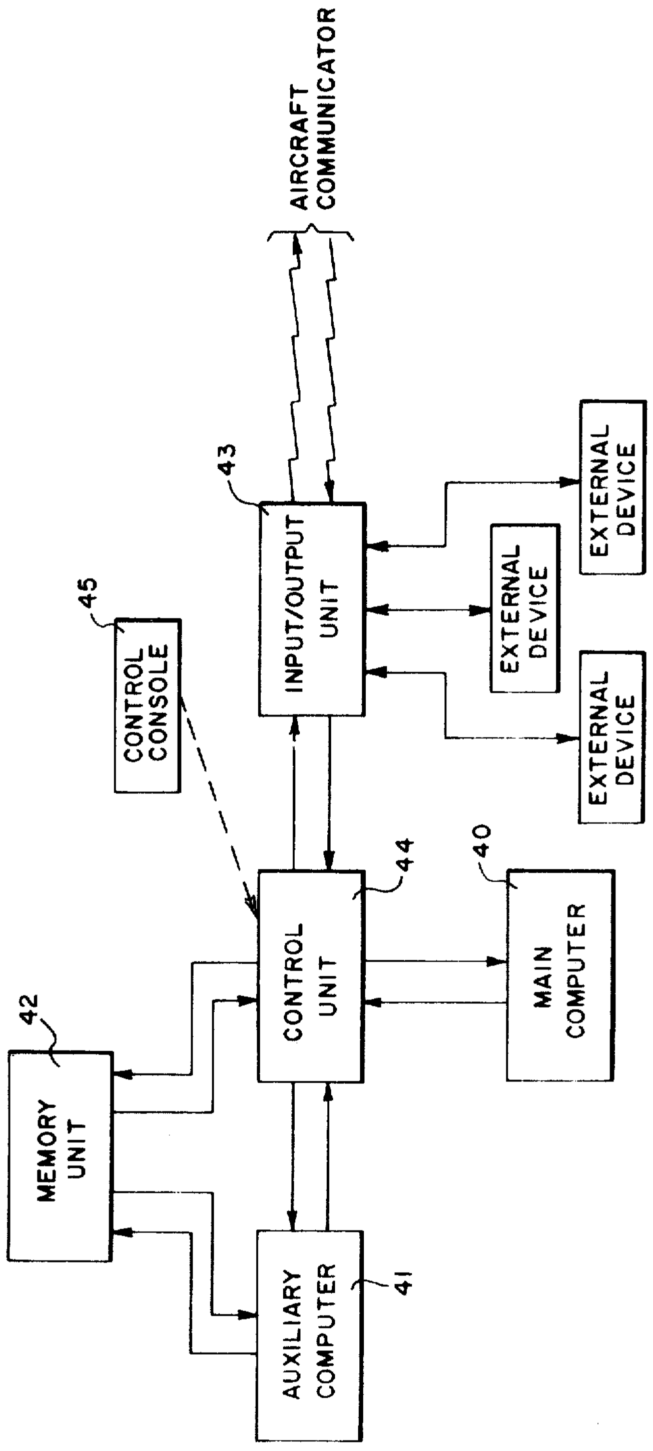
FIG. 2 is a block diagram of the multicomputer System of of the instant invention.

The Multicomputer System 20 of FIG. 2 simultaneously performs a plurality of data-processing tasks. In performing these simultaneous tasks, System 20 simultaneously executes a plurality of programs, one program for each data-processing task being performed. The data-processing system illustrated in FIG. 2 is particularly adapted to provide the data-processing requirements of a real-time environment of the type described with respect to FIG. 1, wherein immediate and direct data-processing tasks are performed expeditiously by one data processor, and wherein ancillary data processing tasks are performed by another data processor.

Thus, System 20 comprises a Main Computer 40, which is a data processor primarily executing the programs performing the immediate and direct data-processing tasks required by the real-time environment. An Auxiliary Computer 41 is a data processor primarily executing programs performing data-processing tasks ancillary to the tasks performed by Main Computer 40. Each of Computers 40 and 41 responds to a plurality of instructions of different programs to perform corresponding data processing tasks on information provided to the respective Computer. The instructions of each program are supplied to the executing Computer in the sequential order necessary to control the Computer to execute the corresponding data-processing task.

A Memory Unit 42 stores data words representing information which is to be processed, data words representing information which is the result of processing, and data words representing instructions to be executed by Computers 40 and 41. Each data word is stored in a discrete memory location, or "cell," of Memory Unit 42. For a data word to be inserted into or retrieved from a particular cell, Memory Unit 42 must be supplied with a unique identification, or address, of the cell.

An Input/Output Unit 43 functions as an information transfer apparatus, providing communication between Multicomputer System 20 and a plurality of external devices. These external devices supply information for processing, supply programs to process the information, and receive the processed result information.

One form of external device employed directly by the operator of Multicomputer System 20 is an electric typewriter. From the electric typewriter, data or programs may be transferred to Input/Output Unit 43 for use by Multicomputer System 20. The electric typewriter may receive processed result information from Input/Output Unit 43 for display.

Another form of external device coupled to Input/Output Unit 43 is Aircraft Communicator 15. Input/Output Unit 43, therefore, also functions as an automatic information transfer apparatus for data provided and required by a real-time environment. Thus, Input/Output Unit 43 communicates with Aircraft Communicator 15, FIG. 1, receiving data defining the current location of each aircraft and transmitting control data for each aircraft.

A Control Unit 44 directs and schedules all communications between Main Computer 40, Memory Unit 42, and Input/Output Unit 43. Additionally, Control Unit 44 directs and schedules all communication between Main Computer 40 and Auxiliary Computer 41. Finally, Control Unit 44 directs and schedules a portion of the communication between Auxiliary Computer 41 and Memory Unit 42; however, Auxiliary Computer 41 also has the capability of directly communicating with Memory Unit 42.

In the environment of FIG. 1 the directing and scheduling functions of Control Unit 44 include: (a) transferring aircraft position data from Input/Output Unit 43 to Main Computer 40; (b) transferring aircraft control data from Main Computer 40 to Input/Output Unit 43; (c) transferring prior-computed course data, aircraft characteristics, and programs from Memory Unit 42 to Main Computer 40; (d) transferring instructions prepared by Main Computer 40 for directing ancillary data-processing tasks and transferring computed course data from Main Computer 40 to Auxiliary Computer 41; (e) transferring certain control signals from Auxiliary Computer 41 to Main Computer 40; and (f) transferring course data and information defining the validity and correctness of this course data from the Auxiliary Computer 41 to Memory Unit 42.

Multicomputer System 20 also comprises a Control Console 45, which provides an operation indicating and manual control station for the operator, whereby the operator is provided access to the System for modification of the order of execution of the instructions or for revision of data.

Multicomputer System 20 processes information represented by the binary code. With the binary code, each element of information is represented by a binary digit, sometimes termed a "bit," each binary digit being either a 1 or a 0. In the instant system the binary 1 may be represented by a relatively positive electrical signal and the binary 0 by a relatively negative electrical signal.

The unit of information primarily employed in data-processing is termed the data word. The data word in System 20 comprises 12 bits. The first digit of the data word is termed the most significant digit (MSD) and the last digit is termed the least significant digit (LSD). The digits between the MSD and the LSD are accorded successively decreasing orders of significance. Generally, two types of data words are employed, the operand word and the instruction word.

The operand word is a data word on which an arithmetic or logical operation is to be performed by one of Computers 40 or 41, a data word which is the result of one of these data-processing operations, or a data word representing constant information employed in performing data-processing operations on other operands. The operand word representing information which is to be processed or which is to be used in processing may be received, for example, by Main Computer 40 from Memory Unit 42. The operand word representing information which is the result of processing may be transmitted, for example, by Main Computer 40 to Input/Output Unit 43.

The instruction word is employed by one of Computers 40 or 41 to direct a discrete step in a data-processing operation. Instruction words may be received, for example, by Computer 40 from Memory Unit 42.

One form of instruction word comprises both a command and address portion. The command represents the type of step to be executed by a Computer. When an instruction is received by a Computer, the command controls the Computer to execute the represented step. One form of instruction address is a representation of a cell in Memory Unit 42. The addressed cell supplies an operand for processing or receives a processed operand for storage. Another form of instruction address is a representation of the first cell of a series of sequential cells in Memory Unit 42. The addressed cell sequence is the source of a related series of operand words or instruction words.

Another form of instruction word comprises only a command. In this instance, if one or more operand words are required in the step to be executed, they are either present in the executing Computer or they are retrievable from a predetermined cell or series of cells in Memory Unit 42.

The detailed structure and operation of the invention will now be described. In the description of the invention which follows, a detailed explanation of the exact structure of the component parts has not been provided since the invention does not relate to the structure per se of each component part but to the combination formed thereby and the manner of cooperation. In the present state of the art of component parts necessary to provide logical and arithmetic operations there can be found numerous examples of most of the individual component parts utilized in the instant invention. The circuits of the various component parts which do not fall into identifiable classes can be determined by one skilled in the art, utilizing circuit design or logical organization techniques in accordance with the overall structure and mode of operation which will be described.

Figure 3:
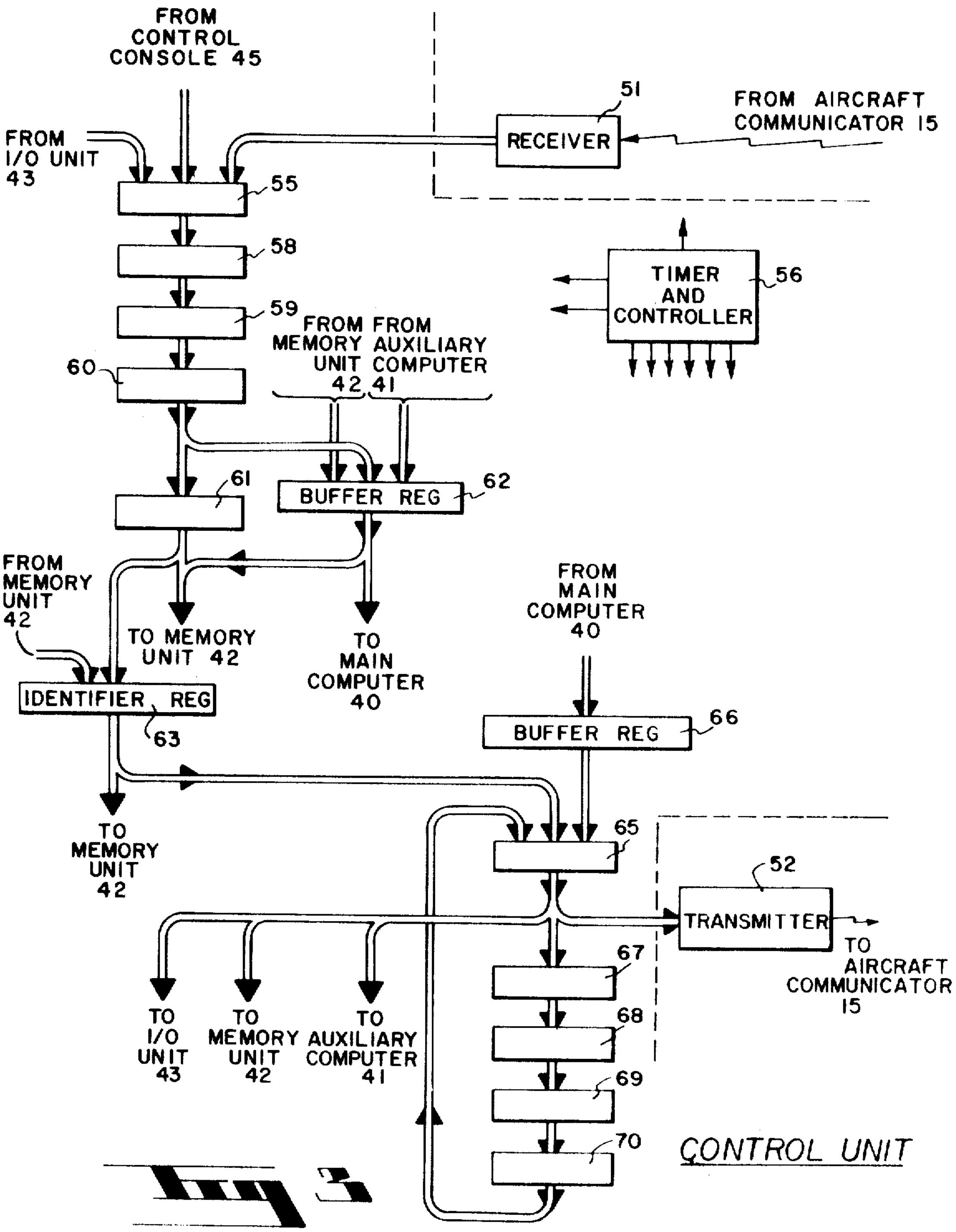
FIG. 3 is a block diagram of the Control Unit of the System of FIG. 2.

Control Unit 44 of FIG. 3 directs and schedules communications between the various components of Multicomputer System 20. Additionally, Control Unit 44 generates master timing signals to provide coordination between the system components in executing their interrelated functions and in transferring data therebetween.

A portion of Input/Output Unit 43 comprising Receiver 51 and Transmitter 52 are shown in FIG. 3 for clarifying the description of the operation of Multicomputer System 20 in the environment of FIG. 1. Receiver 51 receives radiofrequency signals representing groups of five data words, each group comprising an aircraft identifier and data relating to the identified aircraft. Receiver 51 translates the received radiofrequency signals into corresponding signals intelligible to System 20 and transmits the translated signals to an Input Register 55 of Control Unit 44.

A Timer and control 56 generates and distributes control and timing signals on paths, not shown, for scheduling all operations and data transfers within Control Unit 44 and for directing and scheduling communications and providing coordination between the various components of Multicomputer System 20.

A register is a device for providing storage of a relatively small number of binary digits for a relatively short duration, such as the time required to execute one or two instructions. Register 55 and a plurality of additional registers 58, 59, 60 and 61 are each adapted to store one data word.

Input Register 55 is controlled to selectively receive data words from Receiver 51, Input/Output Unit 43, or Control Console 45. Register 55 is coupled to transfer the contents thereof to register 58, register 58 is coupled to transfer the contents thereof to register 59, and register 59 is coupled to transfer the contents thereof to register 60. Register 60 is coupled to transfer the contents thereof to register 61 and to a Buffer Register 62. Register 61 is coupled to transfer the contents thereof to an Identifier Register 63 and to Memory Unit 42. The data transfers between the component parts of Control Unit 44, including these registers, is controlled by Timer 56.

In one mode of operation, registers 55 and 58–61 provide temporary storage for each data group received from Aircraft Communicator 15. Accordingly, when such a data group is received by System 20, the first arriving data word of this group, which may comprise the aircraft identifier, is transferred from Receiver 51 to register 55 and then immediately through registers 58, 59 and 60, in succession, to register 61. The next arriving data words of the group are similarly transferred from Receiver 51 and stored in respective ones of registers 55 and 58–60, the last arriving data word of the group being stored in register 55.

When Main Computer 40 completes the task it is executing at the time a data group is received by Receiver 51 and stored in registers 55 and 58–61, the data word contents of registers 55 and 58–60 are transferred sequentially through Buffer Register 62 to Main Computer 40. Accordingly, Buffer Register 62 is coupled to transfer the contents thereof to Main Computer 40. Buffer Register 62 is also coupled to transfer the contents thereof to Identifier Register 63 and to Memory Unit 42. Buffer Register 62 is controlled by selectively receive data words from Auxiliary Computer 41, Memory Unit 42 and register 60.

Identifier Register 63 holds the data word identifier of the aircraft for which Main Computer 40 is currently performing data-processing operations. Identifier Register 63 is coupled to transfer the identifier contents thereof to Memory Unit 42 and to a register 65. Identifier Register 63 is controlled to selectively receive data words from Memory Unit 42 and registers 61 and 62.

A Buffer Register 66 is controlled to receive data words from Main Computer 40. Buffer Register 66 is coupled to transfer the contents thereof to register 65. Registers 65, 66, and a plurality of additional registers 67, 68, 69 and 70 are each adapted to store one data word. Register 65 is controlled to selectively receive data words from registers 63, 66 and 70. Register 65 is coupled to transfer the contents thereof to register 67, to Auxiliary Computer 41, to Memory Unit 42, to Input/Output Unit 43 and to Transmitter 52. Register 67 is coupled to transfer the contents thereof to register 68, register 68 is coupled to transfer the contents thereof to register 69, register 69 is coupled to transfer the contents thereof to register 70, and register 70 is coupled to transfer the contents thereof to register 65.

In one mode of operation of System 20, registers 65 and 67–70 provide temporary storage for each group of five data words to be transmitted to Aircraft Communicator 15, each such group comprising an aircraft identifier and control data for directing the identified aircraft. The data words of this data group are received sequentially by Buffer Register 66 from Main Computer 40 and transferred into respective ones of registers 65 and 67–70. When Transmitter 52 is ready to transmit radiofrequency signals representing the control data group to Aircraft Communicator 15, the data word contents of registers 65 and 67–70 are transferred sequentially from Register 65 to Transmitter 52. At this time the first data word transferred from register 65 to Transmitter 52 is the data word stored in register 65, which may comprise the aircraft identifier. The next data words of the group are transferred in sequence from registers 67–70, through register 65, to Transmitter 52. Transmitter 52 translates the signals received from register 65 into corresponding radiofrequency signals for transmission to Aircraft Communicator 15.

Figure 4:
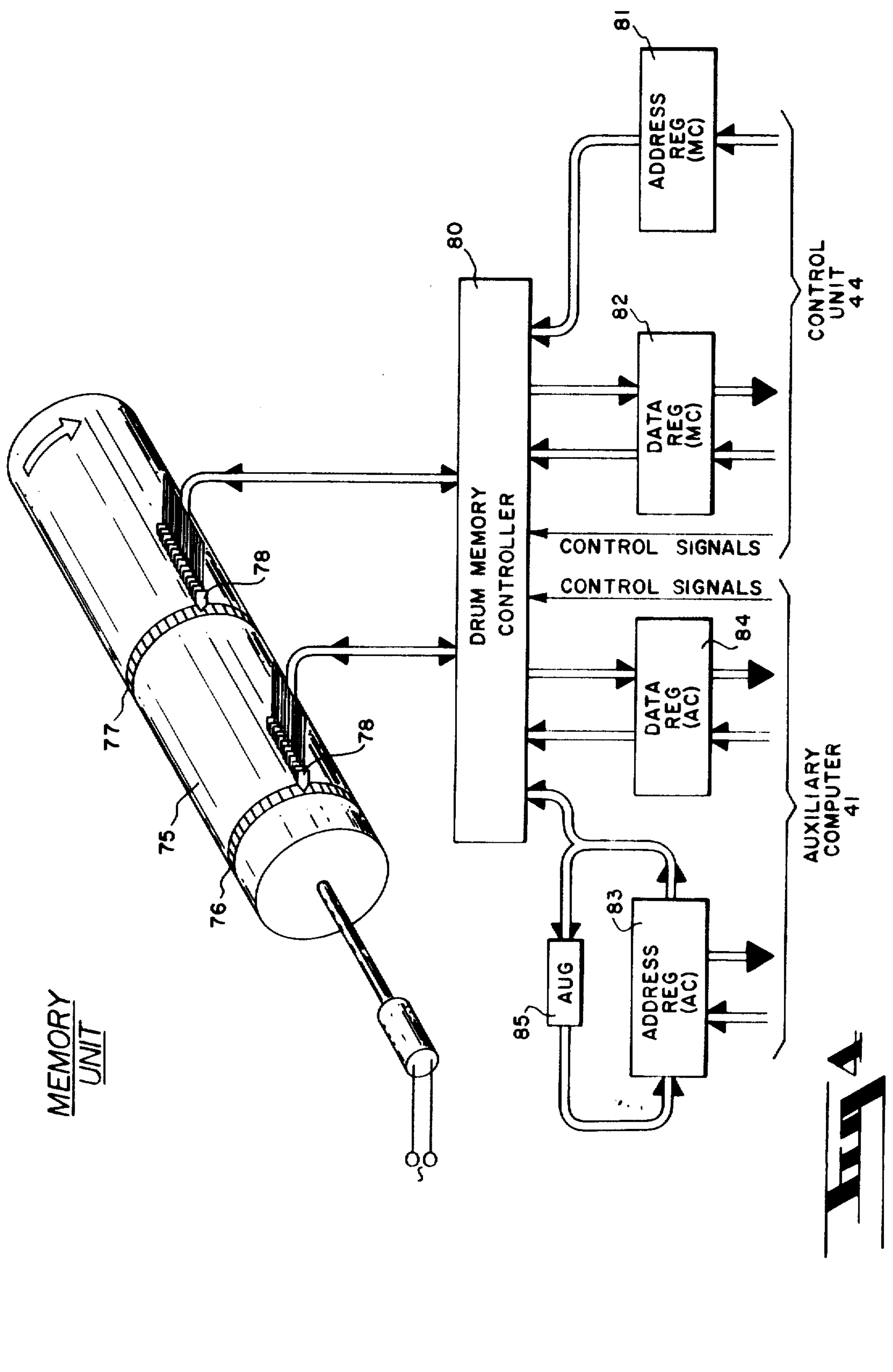
FIG. 4 is a block diagram of the Memory Unit of the System of FIG. 2.

Memory Unit 42 of FIG. 4 stores data words in respective addressable cells. The particular cell from which a data word is retrieved or into which a data word is inserted is identified by the unique address of the cell.

Memory Unit 42 comprises a continuously rotating drum 75 having a magnetizable surface organized into a plurality of circumferential data tracks, only two such tracks 76 and 77 being represented in FIG. 4. Each drum track has a respective one of magnetic heads 78 disposed opposite thereto for writing, i.e., inserting, data into the corresponding track, and for reading, i.e., retrieving, data from the corresponding track. In writing data into a track, a head 78 responds to electrical signals representing binary digits to magnetically polarize the opposing track to correspond to the binary digits. In reading data from a track, a head 78 senses the magnetic polarization of the opposing track to deliver electrical signals corresponding to the binary digits represented by the polarization.

Although only two tracks are represented in FIG. 4, the actual number of tracks employed depends on the amount of data and the size of the programs to be stored. Therefore, drum 75 may comprise, for example, 16, 32, etc. tracks. Two of the tracks may be employed to provide timing signals for synchronizing the reading and writing of data on the other tracks of the drum.

Each data track comprises a predetermined number of sectors, or cells, each sector being adapted to store a data word. When a data word is to be inserted into or retrieved from a particular sector, the corresponding address of the sector must be supplied. The address comprises a track number portion and a sector number portion. Each track number uniquely identifies a respective one of heads 78. Accordingly, if 16 data tracks are employed, the track number will be one of the numbers in the range 0–15. Each sector number identifies a respective one of the sectors in a track, the sectors being sequentially numbered along the drum circumference from a predetermined reference point on the periphery of the drum. Accordingly, if each track comprises 32 sectors, the sector number will be one of the numbers in the range 0–31. Therefore, when the particular sector specified by the sector number portion of an address is opposite the one of heads 78 specified by the track number portion of the address, the head is enabled by a Drum Memory Controller 80 to read from or write into the sector.

Drum Memory Controller 80 is adapted to simultaneously control the reading or writing of data in sectors of two different tracks of drum 75. In response to control signals received from Controller 56 of Control Unit 44, Controller 80 enables the addressed head 78 to read or write data. An address inserted into Address Register 81, upon receipt from register 62, 63, or 65 of Control Unit 44, identifies the track and sector to be written into or retrieved from. If a data word is to be written, Data Register 82 receives a data word from one of Registers 62, 63 or 65 of Control Unit 44. When the addressed sector is opposite the addressed head 78, the addressed head is either enabled by Controller 80 to insert a representation of the data word in Register 82 into the opposing sector or to retrieve the data word contents of such sector and transfer the data word to Data Register 82. In the latter instance, the contents of Data Register 82 are immediately thereafter transferred to Buffer Register 62 or Identifier Register 63 of the Control Unit.

In a similar manner Controller 80 responds to control signals received from a Controller 150 of Auxiliary Computer 41 to enable the addressed head 78 to read or write data. An Address inserted into Address Register 83, upon receipt from Arithmetic Unit 151 of Auxiliary Computer 41, identifies the track and sector to be written into or retrieved. If a data word is to be written, Data Register 84 receives a data word from Arithmetic Unit 151 of Auxiliary Computer 41. An Augmenter 85 is provided for repetitively incrementing or decrementing the contents of Address Register 83. Under control of Controller 80, the address in Address Register 83 may be circulated through Augmenter 85 as successive sectors pass opposite a head 78 and the sector number incremented to address the next-following sector. Accordingly, a single address provided by Auxiliary Computer 41 may be employed to control the reading or writing of a related series of data words in the addressed track.

Although a magnetic drum has been illustrated in the embodiment as comprising the storage member of Memory Unit 42, it is also within the scope of the instant invention to provide any form of well-known random access memory, such as the coincident current, random access, magnetic core memory.

Figure 5:
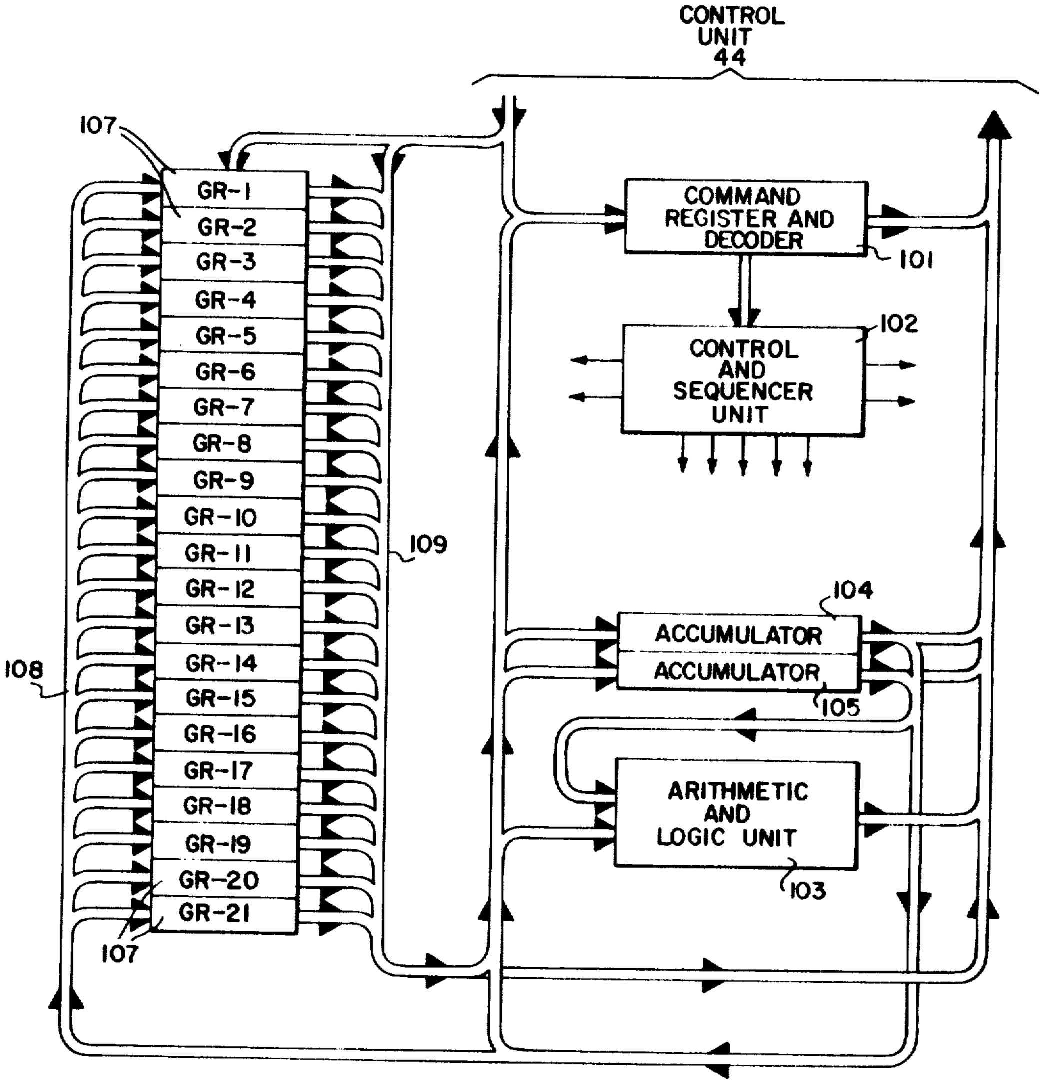
FIG. 5 is a block diagram of the Main Computer of the System of FIG. 2.

Main Computer 40 of FIG. 5 primarily executes programs providing the immediate and direct data-processing tasks required by the real-time environment. Thus, Main Computer 40 responds to each of the aforementioned data groups received from Aircraft Communicator 15 to compute a course for the aircraft to follow to the gate, to compute the arrival time at the gate for such course, and to compute control data for directing the aircraft to follow such course. Additionally, the Main Computer prepares instructions for controlling Auxiliary Computer 41 to perform ancillary data-processing operations on the arrival time and course data.

Main Computer 40 responds to a plurality of distinct instructions to execute a plurality of corresponding data-processing steps. The instructions are obtained in sequential order from Memory Unit 42 through and under control of Control Unit 44. As the instructions are received they are inserted into a Command Register and Decoder 101 and immediately executed. The command portion of the instruction represents the type of step to be executed by Main Computer 40. Each command is decoded by Command Register and Decoder 101 to provide a unique order signal corresponding to the type of step represented. Decoder 101 is coupled to transfer the order signals provided thereby to a Control and Sequencer Unit 102.

In response to each different order signal received from Decoder 101, Control and Sequencer Unit 102 generates a corresponding plurality of control signals for directing the transfer and processing of data throughout the Main Computer. Additionally, Unit 102 generates timing signals for controlling the sequence of execution of the particular substeps of each different data-processing step. The control and timing signals generated by Unit 102 are distributed on paths, not shown, to the various component parts of Main Computer 40 for effecting the functions directed and controlled by these signals.

Command Register and Decoder 101 is also coupled to transfer the address portion of the instruction, at the proper time during the period of execution of the instruction, through Control Unit 44 to Memory Unit 42, if the instruction is of the type including an operand address. The operand address enables the retrieval from or storage into Memory Unit 42 of the operand involved in the data processing step controlled by the command portion of the instruction.

An Arithmetic and Logic Unit 103, under control of Unit 102, performs arithmetic operations, such as addition or subtraction, or logical operations, such as data modification functions, on data words received thereby. Unit 103 is controlled to selectively receive data words from Control Unit 44, from accumulators 104 and 105, and from registers 107. Unit 103 is coupled to transfer the result data generated thereby to Control Unit 44, to Command Register and Decoder 101, to accumulators 104 and 105, and to registers 107.

Accumulators 104 and 105 are adapted to provide temporary storage of data words, including data to be processed or data which is the result of processing. Each of accumulators 104 and 105 is controlled to selectively receive data words from Control Unit 44, from Arithmetic and Logic Unit 103, from registers 107, or from the other accumulator. Each accumulator is coupled to transfer the contents thereof to Control Unit 44, to Command Register and Decoder 101, to Unit 103, to registers 107, and to the other accumulator.

A register group comprising 21 group registers 107, respectively identified as GR–1, GR–2, etc., provides temporary storage for a set of related data words. Each of registers 107 is adapted to store one data word. Register GR–1 is controlled to selectively receive data words from Control Unit 44 or from a data bus 108. Each of registers 107 is coupled to transfer the contents thereof to the immediately following one of the registers. For example, register GR–2 is coupled to transfer the contents thereof to register GR–3. Each of registers 107 also is coupled to transfer the contents thereof onto data bus 109 for transmission to Control Unit 44, Command Register and Decoder 101, Unit 103, accumulator 104, or accumulator 105. Additionally, the contents of any one of registers 107 can be transferred to any other one of registers 107 on data bus 109, through Unit 103, and on data bus 108.

In one mode of operation, registers 107 receive the data group provided by Aircraft Communicator 15 for a particular aircraft and data relating to the characteristics and history of this aircraft provided by Memory Unit 42. In response to instructions entered into Command Register and Decoder 101, Control and Sequencer Unit 102 controls Arithmetic and Logic Unit 103 and accumulators 104 and 105 to process the data in registers 107 and compute a course for the aircraft to fly to the gate, the arrival time at the gage for such course, and control data for directing aircraft to follow such course. An instruction is also prepared for subsequently controlling Auxiliary Computer 41 in performing ancillary data processing tasks on the course and arrival time data. The computed course data, arrival time data and control data, and the prepared instruction are stored in certain ones of registers 107. The arrival time and course data, and the prepared instruction are subsequently transferred from the ones of registers 107 in which they are stored through Control Unit 44 to Auxiliary Computer 41. The control data is transferred from the one of registers 107 in which it is stored through Control Unit 44 and Input/Output Unit 43 to Aircraft Communicator 15.

Figure 6:
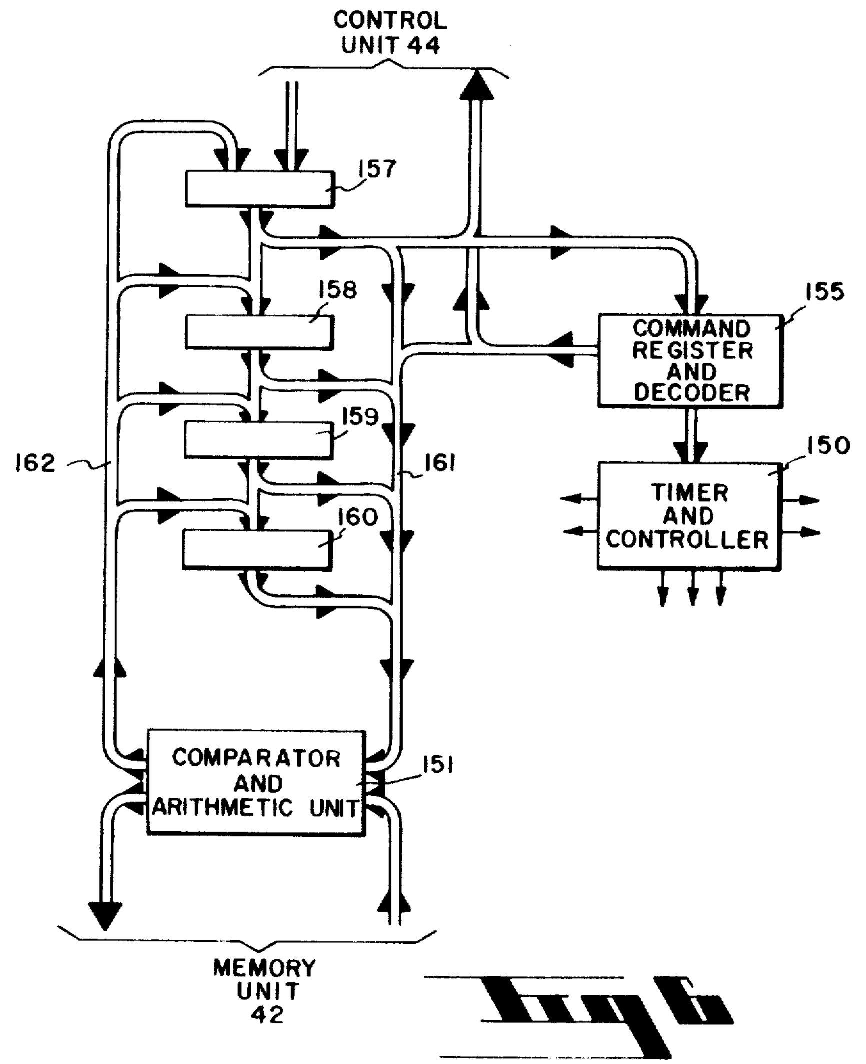
FIG. 6 is a block diagram of the Auxiliary Computer of the System of FIG. 2.

Auxiliary Computer 41 of FIG. 6 primarily executes programs providing data processing tasks ancillary to the tasks performed by Main Computer 40. Thus, Auxiliary Computer 41 determines the validity of each ideal arrival time generated by Main Computer 40 and analyzes each set of course data to verify that the corresponding course is safe.

The Auxiliary Computer responds to a plurality of distinct instructions to execute a plurality of corresponding data-processing steps. The instructions are obtained from Main Computer 49 or from Memory Unit 42 through and under control of Control Unit 44. As each instruction is received, it is transferred through a register 157 and inserted into a Command Register and Decoder 155, whereupon it is immediately executed. The command portion of the instruction represents the type of step to be executed by Auxiliary Computer 41. Each command is decoded by Command Register and Decoder 155 to provide a unique order signal corresponding to the type of step represented. Decoder 155 is coupled to transfer the order signals provided thereby to a Timer and Controller 150.

In response to each different order signal received from Decoder 155, Timer and Controller 150 generates a corresponding plurality of control signals for directing the transfer and processing of data throughout the Auxiliary Computer. Additionally, Timer and Controller 150 generates timing signals for controlling the sequence of execution of the particular substeps of each different data-processing step. The control and timing signals generated by Controller 150 are distributed on paths, not shown, to the various component parts of Auxiliary Computer 41 for effecting the functions directed and controlled by these signals.

Command Register and Decoder 155 is also coupled to transfer the address portion of the instruction, at the proper time during the period of execution of the instruction, through Control Unit 44 or through Comparator and Arithmetic Unit 151 to Memory Unit 42, if the instruction is of the type including an operand address. The operand address enables the retrieval from or storage into Memory Unit 42 of the operand involved in the data-processing step controlled by the command portion of the instruction.

Comparator and Arithmetic Unit 151, under control of Controller 150, performs arithmetic operations, such as addition or subtraction, or comparison operations on data words received thereby. Unit 151 is controlled to selectively receive data words from Memory Unit 42, from Command Register and Decoder 155, and from registers 157, 158, 159 and 160. Unit 151 is coupled to transfer the result data generated thereby to Memory Unit 42 and to registers 157–160.

Each of registers 157–160 is adapted to store one data word. Register 157 is controlled to selectively receive data words from Control Unit 44 or from Unit 151. Each of registers 157–160 is coupled to transfer the contents thereof to the immediately following one of the registers. For example, register 158 is coupled to transfer the contents thereof to register 159. Each of registers 157–160 is also coupled to transfer the contents thereof onto data bus 161 to Unit 151. Additionally, the contents of any one of registers 157–160 can be transferred to any other one of the registers, by transfer on data bus 161, through Unit 151, and on data bus 162. Moreover, register 157 is coupled to transfer the contents thereof to Control Unit 44 and Command Register and Decoder 155.

In one mode of operation, registers 157–160 receive the data word set representing an ideal course computed for a particular aircraft by Main Computer 40, and Command Register and Decoder 155 receives an instruction prepared by Main Computer 40 for controlling Comparator 151 to compare this ideal course data word set with all previously computed data word course sets for other aircraft to verify that the ideal course is safe. In response to the instruction, Timer and Controller 150 controls Comparator and Arithmetic Unit 151 to receive data from Memory Unit 42 for comparing the ideal course data in registers 157–160 with corresponding course data for other aircraft stored in Memory Unit 42. Comparator 151 thereby senses whether a conflict exists between the course represented in registers 157–160 and any other one of the stored courses. If a conflict is determined to exist, an indication thereof is transferred to and inserted into Memory Unit 42, under the direction of Controller 150.

One mode of operation of the instant invention will now be described. This mode relates to the interrelated data-processing tasks performed by Main Computer 40 and Auxiliary Computer 41 in computing gate arrival time, a course, and control data immediately after an aircraft is acquired by the environment of FIG. 1, wherein a plurality of other aircraft are currently operating in the environment and previously have been provided respective unique gate arrival times and safe courses.

Initial control over an aircraft is asserted shortly after the aircraft closes to within 200 miles of the carrier. Immediately after obtaining first positional data of an aircraft within the 200-mile range from the associated radar, Aircraft Communicator 15 assembles a data group for transmission to Multicomputer System 20. The data group transmitted comprises five data words, one data word comprising the aircraft identifier number, obtained from a transponder radio in the aircraft; three data words comprising the relative altitude, range, and bearing of the aircraft; and one data word comprising status information relating to the aircraft, and including, for example, a representation as to whether the aircraft has priority in its approach and a representation that no previous data has been transmitted with respect to this aircraft in its present approach. Aircraft Communicator 15 transmits the data group in the form of radiofrequency signals to aircraft carrier 10.

Succeeding data groups for the same aircraft now are provided approximately each 6 seconds by Aircraft Communicator 15, until the aircraft approaches to within a predetermined distance from the carrier, such as to the descent cone, whereupon the data groups are provided once each second.

Upon receipt of the radiofrequency data group signals for a newly acquired aircraft from Aircraft Communicator 15, Receiver 51 of Input/Output Unit 43, FIG. 3, translates the radiofrequency signals into corresponding binary digital signals intelligible to System 20. Receiver 51 thereupon transmits the translated signals to Input Register 55 of Control Unit 44. The data words of the data group are transferred through register 55 and registers 58–61, until the five data words of the group are stored in respective ones of these five registers. Thus, the first arriving data word of the group, the aircraft identifier, enters register 61, the status data word enters register 60, the bearing data word enters register 59, the range data word enters register 58, and the altitude data word enters register 55.

When Main Computer 40 completes the task it has been executing at the time of arrival of the above-mentioned data group, a task which normally comprises performing data-processing operations on the immediately preceding data group received by Receiver 51, the identifier contents of register 61 are transferred to Identifier Register 63 and the data word contents of registers 55 and 58–60 are transferred sequentially through Buffer Register 62 to Main Computer 40. The contents of Identifier Register 63 now denote that Main Computer 40 is performing data-processing tasks for the identified newly acquired aircraft.

The four data words of the data group which are received by Main Computer 40 are transferred through registers 107 of the group register, FIG. 5, and into respective ones of the registers GR–18, GR–19, GR–20, and GR–21. The contents of these four registers 107 at this time are shown schematically in the first line of FIG. 7, the first line represents the contents of the six registers GR–16 to GR–21 after Main Computer 40 receives input information from Control Unit 44 following receipt of a data group by Receiver 51. Thus, register GR–18 now holds a 7-bit data word representing the last-determined actual altitude of an aircraft, register GR–19 holds a nine bit data word representing the last-determined range of the aircraft, register GR–20 holds a nine bit data word representing the last-determined bearing of the aircraft, and register GR–21 holds a 12 bit data word representing certain status information for this aircraft.

Control Unit 44 next supplies automatically the appropriate address and control signals to Memory Unit 42 for retrieving the stored characteristics and course history of the aircraft represented in Identifier Register 63. The address supplied may comprise the aircraft identifier itself, since the characteristics and history data of each aircraft may be stored in a predetermined set of drum tracks in parallel sectors all having addresses corresponding to the respective aircraft identifier number. The retrieved characteristics and history data are transferred sequentially from Data Register 82 of the Memory Unit through Buffer Register 62 of the Control Unit and into various ones of registers 107 of the Main Computer.

Figure 7:
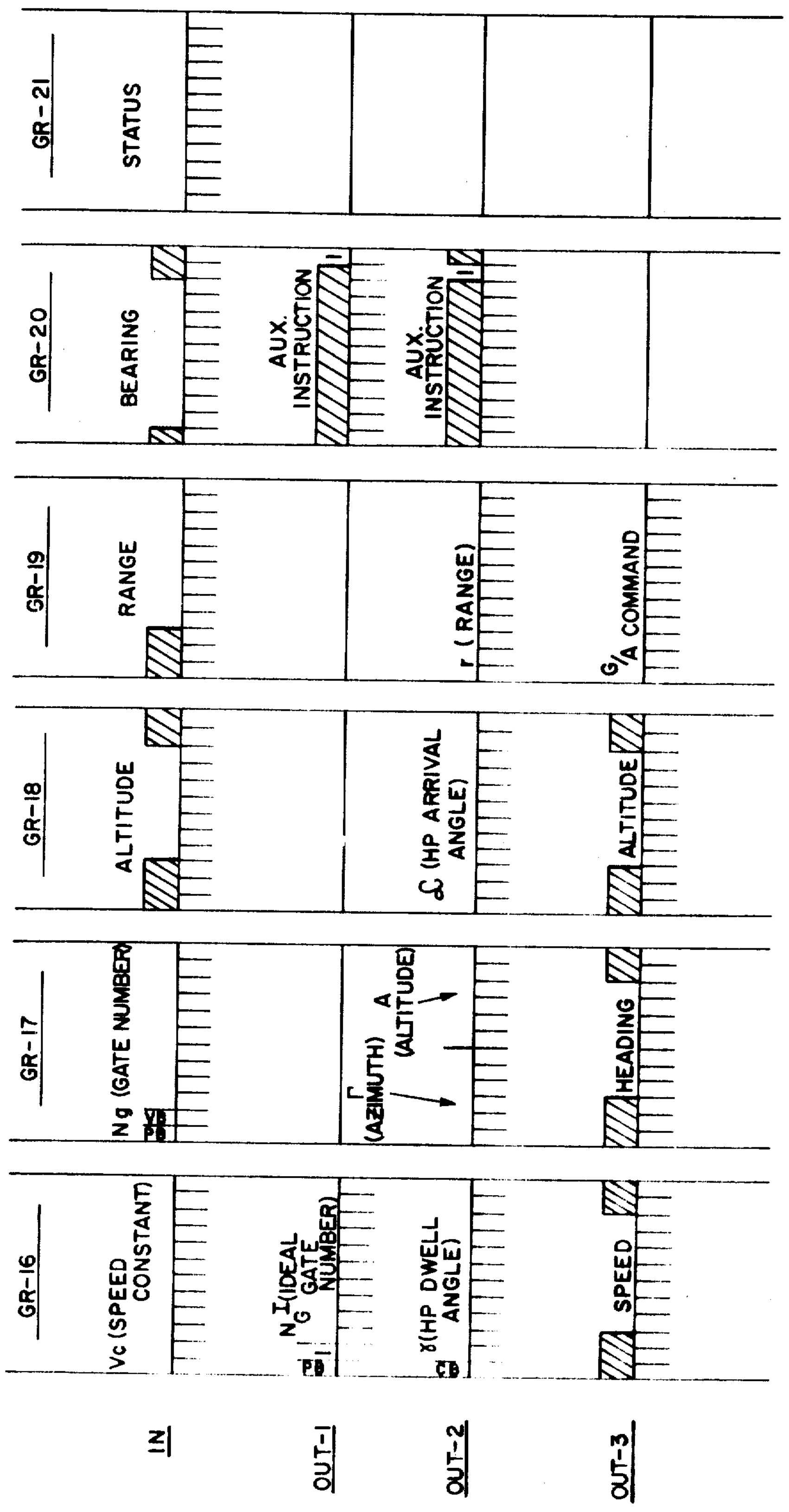
FIG. 7 is a symbolic diagram of the binary digital structure of various data words employed in the System.

The history data words are blank at this time, since prior to initial acquisition of an aircraft, historical information representing the computed aircraft course and arrival time do not exist. Hence, the gate number assigned to the aircraft, and shown in the first line of FIG. 7, is not supplied at the time the first data group is received for a newly acquired aircraft, but is only supplied following receipt of each subsequent data group for this aircraft. However, the aircraft characteristics are always available in Memory Unit 42 for all aircraft acquired or to be acquired. Therefore, one such characteristic, the optimum speed, Vc, for the identified aircraft has been now entered into Register GR-16 of the Main Computer, as shown in the first line of FIG. 7.

A succeeding instruction received by Command Register and Decoder 101 from the Memory Unit controls the transfer of the status word contents of register GR-21 through Arithmetic and Logic Unit 103 and back to register GR-21. Logic Unit 103 senses the status word to determine aircraft status and, in particular, to determine whether a previous data group has been provided for the aircraft and whether the aircraft has priority status. If the data group is the first provided for the aircraft, one of the bits of the status word, for example, the least significant bit thereof, may be a binary 1. Therefore, the least significant bit of the status word constitutes a notification to the Main Computer as to how the data group should be processed.

In the mode of operation being described, the least significant bit of the status word is now a binary 1, whereupon the Main Computer, upon sensing this bit, prepares to obtain a corresponding series of instructions from the Memory Unit. The particular series of instructions called for provides for processing the current data group, utilizing the retrieved aircraft characteristics, to compute the ideal course for the aircraft to fly to the gate and the gate arrival time for the aircraft flying this ideal course.

The ideal course and corresponding ideal arrival time for the aircraft are computed by Main Computer 40 without considering the courses and arrival times already computed for and assigned to other aircraft earlier acquired and approaching the gate, such courses providing mutually safe paths for these other aircrafts to follow to arrive at the gate with respective unique arrival times. The computation of the ideal course includes a computation of the level at which the aircraft is to fly from its present position to the descent cone. The altitude to be assigned is computed from the present aircraft altitude by transferring the altitude data contents of register GR-18 to Unit !03. Unit 103 thereupon computes the one of 26 allowable levels (described heretofore) nearest to the present aircraft altitude. If the aircraft is flying above 40,000 feet when acquired, it is assigned to the maximum allowable altitude, 40,000 feet. The computed value of the altitude for the ideal course is then transferred from Logic Unit 103 into the six least significant bit positions of register GR-17, as shown in the third line of FIG. 7, which represents the second set of output data words to be provided by the Main Computer.

The computation of the ideal course also includes a computation of the common azimuth of the radial path which the aircraft is to fly from its present position to the descent cone and of the descent path the aircraft is to follow. The common azimuth of these radial and descent paths is computed from the present aircraft bearing by transferring the bearing data contents of register GR-20 to Unit 103. Unit 103 thereupon computes the one of 64 allowable radial paths (described heretofore) nearest to the present aircraft bearing. The computed value of the azimuth for the ideal course is then transferred from Unit 103 into the six most significant bit positions of register GR-17.

Data representing the last-determined range of the aircraft remains unchanged in register GR-19.

Registers GR-16 and GR-17 now contain the particular information required for the newly acquired aircraft to fly the ideal course to the gate on a particular schedule. Thus, register GR-16 contains the optimum speed for the aircraft to fly along the assigned radial path to the descent cone. GR-17 contains the azimuth and altitude of the ideal radial path and the azimuth of the descent path.

Although the third line of FIG. 7 also represents holding path dwell angle information in register GR-16 and holding path arrival angle information in register GR-18, these two values do not comprise a part of the ideal course, and they are only computed during subsequent computation periods if the aircraft is required to fly along a holding path.

The Main Computer next computes an ideal arrival time at the gate and, for this ideal arrival time, generates an ideal gate number, both ideal arrival time and ideal gate number being computed without considering gate numbers already assigned to other aircraft earlier acquired and approaching the gate. The gate number for an aircraft is a value indicating the relative time of arrival of that aircraft with respect to all other aircraft scheduled to arrive at the gate. The ideal gate number is computed from the time of arrival of the newly acquired aircraft at the gate, the time of arrival being computed from the assigned ideal course.

The time of arrival at the gate is determined by computing first the time, $T_1$, for the aircraft to fly from its present range to the descent cone at the assigned altitude and with the optimum speed. In computing $T_1$ the range contents of register GR-19, the altitude contents of register GR-17, and the optimum speed contents of register GR-16 are transferred to Unit 103. The computed value of $T_1$ is then transferred from Unit 103 to one of registers 107 for temporary storage. The time, $T_2$, for the aircraft to descend along the descent path to the gage is next computed. In computing $T_2$ the altitude contents of register GR-18 and the allowable values of descent rate and speed on the descent cone (described heretofore), and which are provided directly from the Memory Unit by the instructions employed in this portion of the program, are transferred to Unit 103. The computed value of $T_2$ is then transferred from Unit 103 to another one of registers 107 for temporary storage. The values of times $T_1$ and $T_2$ are next transferred from registers 107 to Unit 103 and added therein to time $T_0$, the current time, which is provided by Timer and Controller 56 of the Control Unit. The computed sum, $T_A$, which represents the aircraft time of arrival at the gage for the computed ideal course is then transferred from Unit 103 to one of registers 107 for temporary storage.

The ideal gate number, $N_G'$, next is computed by dividing the time of arrival at the gate, $T_A$, for the ideal course by the value of the current landing interval, $L_A$. The landing interval, generally, is the minimum allowable time between the arrival of two aircraft at the carrier for given conditions of operation in the environment. A landing interval in the range of 32 to 128 seconds is preassigned for the system and stored in the Memory Unit. A gate number is an arrival time at the gate divided by the landing interval. Accordingly, sequential gate numbers represent scheduled sequential arrivals of respective aircraft at the gate, and adjacent gate numbers represent sequential arrivals of aircraft separated by only the landing interval. Accordingly, the value of $T_A$ is transferred from the one of registers 107 in which it has been stored to Unit 103 and divided therein by the landing interval, which is provided directly from the Memory Unit by the instructions employed in this portion of the program.

As the ideal gate number is being computed by Unit 103, the two most significant bits of the corresponding data word are also being generated. The most significant bit, PB, of the gate number data word is set by Unit 103 to represent a binary 1 is the aircraft is to be accorded priority in landing; otherwise this most significant bit remains a binary 0. The priority status of the aircraft has been determined previously when the status word in register GR-21 was sensed by Unit 103. The second most significant bit of the gate number data word denotes whether the corresponding gate number is valid. A binary 1 in this bit position indicates that the corresponding gate number corresponds to a safe course to the gate. Although the ideal gate number has not yet been validated for uniqueness when it is generated when an aircraft is acquired, the ideal gate number is momentarily assumed valid, and a binary 1 is inserted in the second most significant bit position. The ideal gate number data word comprising the quotient ideal gate number occupying the ten least significant bit positions, the gate validity indicator, and the priority status indicator is transferred from Unit 103 to register GR-16, replacing the speed value therein.

Unit 103 of the Main Computer next prepares an auxiliary instruction for controlling Auxiliary Computer 41 to perform a validity check on the ideal gate number. This instruction comprises binary 0's in the 11 most significant bit positions and a binary 1 in the least significant bit position. Following preparation by Unit 103, this auxiliary instruction is transferred to register GR-20.

The information represented in the second line of FIG. 7 as now occupying registers GR-16 and GR-20 comprises the first set of output data words to be provided by the Main Computer for a newly acquired aircraft. Therefore, the contents of registers GR-16 and GR-20 are next transferred to Buffer Register 66 of Control Unit 44, and through registers 66 and 65 to Auxiliary Computer 41.

The contents of registers GR-17 and GR-19 now represent the ideal assigned course and the last-determined range of the aircraft and are useful sequentially for computing the required position of the aircraft at any time. Therefore, the contents of registers GR-17 and GR-19 are now stored by transfer of these contents to Buffer Register 66 of Control Unit 44, and through registers 66 and 65 to Memory Unit 42. The Control Unit also transfers the aircraft identifier from register 63 to the Memory Unit, and the former contents of registers GR-17 and GR-19 are thereupon inserted into the drum sectors storing history data for the corresponding aircraft.

Main Computer 40 now has completed its processing interval for the data group last received thereby from Aircraft Communicator 15 and is ready to accept the next-awaiting data group, if one is stored in registers 55 and 58-60 of the Control Unit.

At the same time, Auxiliary Computer 41 has received the last computed ideal gate number data word and corresponding prepared auxiliary instruction from the Main Computer. The ideal gate number data word is transferred through registers 157, 158, and 159 and into register 160 of the Auxiliary Computer, FIG. 6. The auxiliary instruction is transferred through register 157 and into Command Register and Decoder 155. Additionally, the Control Unit at this time transfers the corresponding aircraft identifier from register 63 through register 65 and into one of registers 157 to 159 of the Auxiliary Computer, for example, register 157.

The auxiliary instruction now in Command Register and Decoder 155 controls the Auxiliary Computer to perform a data processing task for determining whether the ideal gate number is unique and, therefore, valid. If the ideal gate number is determined to be not unique the Auxiliary Computer modifies the gate number according to predetermined rules.

The uniqueness of the ideal gate number is determined by comparing the number against all scheduled gate numbers for the other aircraft presently being controlled by the System. All of such scheduled gate numbers are stored in a single track on the portion of drum 75 directly accessible by the Auxiliary Computer. The scheduled gate numbers are stored in this track in sequential sectors having respective addresses corresponding to the related aircraft identifier numbers.

The sequential gate number comparison operation is initiated when Arithmetic Unit 151 is controlled by Controller 150 to transmit the address of the first cell of the sector sequence storing the scheduled gate numbers to Address Register 83 of the Memory Unit. This first cell address may be, for example, the number zero. Control signals are also provided by Controller 150 to Drum Memory Controller 80 to control the sequential retrieval of the scheduled gate numbers. In effecting this sequential retrieval, Augmenter 85 repeatedly increments the original address entered into Address Register 83. Each scheduled gate number, when retrieved and entered into Data Register 84 of the Memory Unit is immediately transferred to the Auxiliary Computer and applied to one input terminal of Comparator 151. As each scheduled gate number is applied to Comparator 151, Controller 150 transfers the ideal gate number contents of register 160 to the other terminal of the Comparator, whereby each retrieved scheduled gate number is immediately compared with the ideal gate number. The result of each such comparison by Comparator 151 is evidenced by control signals, not shown, delivered by Comparator 151 to Timer and Controller 150 to effect the next-following substep.

If no scheduled gate number has been found equal to the ideal gate number after all scheduled gate numbers stored in the Memory Unit have been compared with the ideal gate number, the ideal gate number is unique and, therefore, valid. Accordingly, the gate validity bit in the second most significant bit position of the gate number data word in register 160 is continued as a binary 1 and the ideal gate number now is treated as the scheduled gate number for the newly acquired aircraft.

The Auxiliary Computer thereupon transfers the new scheduled gate number to the Memory Unit for storage in the gate number track and to the Control Unit for storage in the history data sectors of the Memory Unit. Storage of the new scheduled gate number in the proper sector of the gate number track of the Memory Unit may be effected by transferring the aircraft identifier contents of register 157 through Arithmetic Unit 151 to Address Register 83 and by transferring the gate number word in register 160 through Arithmetic Unit 151 to Data Register 84. Controller 150 then provides control signals to Drum Memory Controller 80 to control Augmenter 85 to repetitively decrement the original contents of Address Register 83 as each sector of the gate number track passes the corresponding head 78, after the predetermined reference point on the periphery of drum 75 has passed such head. When the contents of Address Register 83 have been reduced to the number zero, the gate number word in Data Register 84 is inserted into the sector of the gate number track opposite the corresponding head 78, the address of this sector corresponding to the aircraft identifier number of the newly scheduled aircraft. Other methods well known in the art may also be employed for storing the newly scheduled gate number in the proper sector of the gate number track of drum 75.

Storage of the new scheduled gate number in the proper history data sector of the Memory Unit may be effected by transferring the gate number word in register 160 and the aircraft identifier word in register 157 through Buffer Register 62 of the Control Unit to the Memory Unit. The new scheduled gate number may then be inserted into a history data sector of drum 75 which corresponds to the identified aircraft, utilizing a method similar to that described above.

If a scheduled gate number is found equal to the ideal gate number during the sequential comparison operation, the operation immediately terminates and the conflicting scheduled gate number so found is transferred from Comparator Unit 15 to an unoccupied one of registers 157-159, such as register 158. At this time the contents of Address Register 83 may be transferred to another one of registers 157-159, such as register 159, these contents at this time being equal to the identifier of the aircraft whose scheduled gate number has been found equal to the ideal gate number. The ideal gate number data word in register 160 is now tested by Arithmetic Unit 151.

If the priority status bit of the ideal gate number word is a binary 0 the ideal gate number portion of the data word will be incremented by one as it passes through Arithmetic Unit 151 and is restored to register 160. The new contents of register 160 are once again compared with all scheduled gate numbers of the gate number track to determine whether the incremented gate number is unique. If a scheduled gate number is found equal to the incremented gate number, the contents of register 160 are again incremented and the operation repeated until the gate number in register 160 has been incremented to a unique value. The gate validity bit of the modified gate number data word is now changed to a binary 0 to denote that the ideal course originally computed for the corresponding aircraft, and presently stored in the history data portion of the Memory Unit, must be modified to define a course corresponding to the modified arrival time. The modified, and now scheduled, gate number data word contents of register 160 are next transferred to the Memory Unit for storage in the gate number track and in the history data sectors of the Memory Unit, as described above. Accordingly, if a nonpriority ideal gate number is found not to be unique, the gate number is increased until it becomes unique. This modification of the ideal gate number delays the scheduled arrival time at the gage of the corresponding nonpriority aircraft and requires a deviation of the aircraft from the ideal course.

If a scheduled gate number is found equal to the ideal gate number as described above, but the priority status bit of the ideal gate number word is a binary 1, the priority status bit of the conflicting scheduled gate number word is now tested. If the priority status bit of the conflicting scheduled gate number word is a binary 0, the ideal gate number now becomes the scheduled gate number for the newly acquired aircraft and is stored in the Memory Unit cells corresponding to this aircraft, as described previously. The conflicting gate number which had been transferred into register 158 is thereupon transferred to register 160 and the identifier in register 159 is transferred to register 157. The conflicting gate number contents of register 160 are now incremented by Arithmetic Unit 151 and then compared with all scheduled gate numbers of the gate number track, this operation being repeated until the conflicting gate number becomes unique. The gate validity bit of this modified gate number data word is now changed to a binary 0 and the data word is transferred to the Memory Unit cells corresponding to the aircraft identified by the identifier contents of register 157. Accordingly, if a priority ideal gate number is found not to be unique and the conflicting scheduled gate number does not have priority status, the ideal gate number becomes scheduled and the conflicting gate number is increased until it becomes unique. This modification of the conflicting gate number delays the scheduled arrival time at the gate of the corresponding nonpriority aircraft and requires a deviation of the aircraft from its previously assigned course.

If a scheduled gate number is found equal to the ideal gate number as described above, but the priority status bits of the respective gate number words are both binary 1's, indicating that both gate numbers represent aircraft accorded priority in landing, the conflicting scheduled gate number will not be modified. Instead, the ideal gate number contents of register 160 will be applied to Arithmetic Unit 151, incremented by one, and restored to register 160, The new contents of register 160 are once again compared with all scheduled gate numbers of the gate number track. If a priority scheduled gate number is again found equal to the incremented gate number the incrementation and comparison operation on the contents of register 160 is repeated. When either no scheduled gate number is found equal to the incremented ideal gate number or a conflicting scheduled gate number does not have priority status, the incremented gate number becomes scheduled and its gate validity bit is changed to a binary 0; in the latter instance the conflicting gate number is modified as described above. The previously described substeps next will be executed to store the new scheduled gate number and the modified conflicting gate number, if such is the case. Accordingly, if a priority ideal gate number is found not to be unique and the conflicting scheduled gate number also has priority status, the ideal gate number is incremented until either it becomes unique or a conflicting conflicting scheduled gate number does not have priority status.

Upon completion of the instant computation interval, the Auxiliary Computer is ready to accept another ideal gate number for scheduling or to perform other special or routine processing operations. One such routine operation comprises updating all range date for each aircraft during each revolution of drum 75, employing either the optimum or the required aircraft speed, according to the location of the aircraft in the environment. The continually updated range data is provided for determining whether each aircraft is flying according to its respective assigned schedule.

Upon receipt of the second radiofrequency data group signals for the recently acquired aircraft from Communicator 15, the System is ready to continue the immediate and direct data-processing tasks required for the aircraft. The data group, as before, comprises five data words, which represent the aircraft identifier, the current aircraft position, and aircraft status information. The status data word now includes a representation that data has been transmitted previously with respect to this aircraft in its present approach.

When Main Computer 40 is ready, it receives and transfers the binary digital represented position and status data words into registers GR–18 to GR–21; FIG. 5 and FIG. 7, first line. Control Unit 44 next controls the retrieval of the stored characteristics and course history of the aircraft from Memory Unit 42. The characteristics and course history are received by Main Computer 40 and inserted into various ones of registers 107. The course history data words now comprise the previously computed ideal course, which includes azimuth and altitude the most recently updated scheduled range; and the most recent gate number, $N_G$, scheduled for the aircraft by the Auxiliary Computer. The retrieved azimuth-altitude data word and the retrieved range data word are inserted into respective ones of registers GR–1 to GR–15. The retrieved scheduled gate number for the aircraft is inserted into register GR–17. The optimum speed characteristic, $V_C$, for the aircraft is inserted into register GR–16.

A succeeding instruction received by Command Register and Decoder 101 from the Memory Unit controls the transfer of the status word contents of register GR–21 through Arithmetic and Logic Unit 103 and back to register GR–21. Logic 103 senses the status word to determine aircraft status and, in particular, to determine whether a previous data group has been provided for the aircraft. In this instance, the least significant bit of the status word is a binary 0, whereupon the Main Computer, upon sensing this bit, transfers a history condition data word from one of registers 107 to Unit 103. The history condition data word comprises a number which denotes the current status of the data-processing tasks being performed for the corresponding aircraft. In this instance the history condition word denotes that the Main Computer has performed data-processing tasks during but one processing interval for the related aircraft, and, therefore, that no course check has yet been performed by the Auxiliary Computer for this aircraft. Upon sensing the instant history condition word the Main Computer next prepares to test the gate number data word.

The contents of register GR–17 next are transferred through Arithmetic and Logic Unit 103 and back to register GR–17. Logic Unit 103 senses the gate number data word to determine the value of the gate validity bit thereof. If the gage validity bit is a binary 0, the scheduled gate number has been modified to correspond to the modified scheduled arrival time. If the gate validity bit is a binary 1, the scheduled gate number is the same as the previously computed ideal gate number, and the previously computed ideal course need not be modified at this time.

In the instance wherein the gate number no longer corresponds to the computed course, the gate number modification represents a delay in aircraft arrival time at the gate. Accordingly, the prior computed course must be modified to delay the aircraft to arrive at the gate at a time corresponding to the gate number. This course modification, in its simplest form, may comprise a holding path segment inserted into the prior computed course. The modified course will thereupon comprise the original radial path to the holding path cone; the holding path segment, which constitutes a circular path along the holding path cone; and a descent path from the holding path cone to the gate. The holding path segment to be flown by the aircraft begins substantially at the azimuth of the radial path and terminates substantially at the azimuth of the descent path, the latter azimuth requiring computation at this time. Thus, the azimuth and altitude of the radial path remain unchanged and comprise a portion of the new course being computed. The holding path segment now to be computed is defined by a holding path arrival "angle," $\alpha$, and a holding path dwell angle, $\gamma$.

The holding path arrival "angle" is computed by first computing the time, $T_F$, for the aircraft to fly from its present position to the holding path cone. In computing $T_F$ the values of the optimum speed, $V_C$, the assigned altitude, A, and the updated range, $r$, are transferred from the ones of registers 107 in which they have been stored to Unit 103. The time of arrival at the holding path cone, $T_C$, is then obtained by adding the current time, $T_0$, which is provided by Controller 56 of the Control Unit, to the computed time $T_F$. The computed time $T_C$ is transferred from Unit 103 to one of accumulators 104 or 105 for temporary storage.

The allowable angular velocity of the aircraft on the holding path cone, a characteristic which is proportional to the allowable aircraft speed on the holding path cone (described heretofore), is next transferred to Unit 103 from the one of registers 107 into which it has been entered. The time $T_C$ is thereupon retrieved from the accumulators and multiplied in Unit 103 by the angular velocity. The result value generated by Unit 103 represents the holding path arrival "angle," $\alpha$. The value of $\alpha$ and $T_C$ are then transferred to respective ones of registers GR–1 to GR–15. Thus, the holding path arrival "angle" is a value proportional to the time of arrival of the aircraft at the holding path cone.

The holding path dwell angle is computed from the difference between the time of difference of the aircraft from the holding path for descending to the gate $T_R$, and the time of arrival, $T_C$, at the holding path. The scheduled time for arrival of the aircraft at the gate, $T_A$, is first computed by transferring both the gate number $N_G$ from register GR–17 and the current landing interval, $L_A$, from the Memory Unit to Arithmetic Unit 103. The gate number is multiplied by the landing interval to provide the time $T_A$. The value of time $T_A$ is thereupon transferred into one of accumulators 104 or 105 for temporary storage. The time $T_2$ for the aircraft to descend along the descent path to the gate is next computed by Unit 103 and transferred to the other one of accumulators 104 and 105. The method of computing time $T_2$ has been described previously herein. The values of times $T_A$ and $T_2$ are next transferred to Arithmetic Unit 103 from accumulators 104 and 105 and the value of time $T_2$ is subtracted from the value of $T_A$. The difference result, which represents the time $T_R$ of departure of the aircraft from the holding path for descending to the gate, is then transferred to one of accumulators 104 or 105. The value of time $T_R$ is then transferred back to Unit 103 and the value of time $T_C$ is transferred to Unit 103 from the one of registers 107 in which it has been stored. Unit 103 subtracts the value of time $T_C$ from the value of time $T_R$, the difference between these two values representing the aircraft holding path time. The aircraft holding path time is immediately multiplied by the above-mentioned allowable holding path angular velocity to provide the holding path dwell angle $\gamma$.

At the same time as the holding path dwell angle $\gamma$ is being computed by Unit 103, the most significant bit of the corresponding data word is set to represent a binary 1. The most significant bit, CB, of the holding path dwell angle data word represents a binary 1 if the computed course is safe; if unsafe this bit is a binary 0. The CB bit is termed the "check bit." Although the instant computed course has not yet been tested for safety, it is momentarily assumed safe and a binary 1 is inserted in the check bit position. The dwell angle data word is thereupon transferred from Unit 103 to register GR–16, replacing the speed value therein.

The azimuth-altitude data word and the range data word, which have been previously retrieved from the Memory Unit and stored in respective ones of registers 107, are now transferred to and replace the contents of the respective registers GR–17 and GR–19. The holding path arrival angle data word is retrieved from the one of registers 107 into which it was transferred upon being computed and is transferred into and replaces the contents of register GR–18.

Unit 103 of the Main Computer next prepares an auxiliary instruction for controlling Auxiliary Computer 41 to perform a safety test on the computed course. The instruction comprises binary 0's in all but the second bit position, which is a binary 1. Following preparation by Unit 103, this auxiliary instruction is transferred to register GR–20. The contents of registers GR–16 to GR–20 are now represented by the third line in FIG. 7.

The set of course constants represented in the third line of FIG. 7 as now occupying registers GR–16 to GR–20 comprises the second set of output data words to be provided by the Main Computer for a newly acquired aircraft. Therefore, the contents of registers GR–16 to GR–20 are next transferred to Buffer Register 66 to Control Unit 44, and through registers 66 and 65 to Auxiliary Computer 41.

The set of course constants in registers GR–16 to GR–19 now represents the unverified assigned course and the last-determined range of the aircraft and are useful subsequently for computing the required position of the aircraft at any time. Therefore, the contents of registers GR–16 to GR–19 are next stored by transfer of these contents to Buffer REgister 66 to Control Unit 44, and through registers 66 and 65 to Memory Unit 42. The Control Unit also transfers the aircraft identifier from register 63 to the memory Unit and former contents of registers GR–16 to GR–19 are thereupon inserted into the drum sectors storing history data for the corresponding aircraft.

In the instance wherein the gate number continues to correspond to the computed course, the course need not be modified at this time. Thus, the azimuth and altitude of the radial path remain unchanged. The course continues to comprise the same radial path to the descent cone and the same descent path that the aircraft is to fly to the gate, the azimuth of both radial and descent paths being the same.

Inasmuch as no delay segment is required in this course the aircraft is not required to turn and fly along the holding path. However, for subsequent employment in testing the safety of the course, the holding path arrival "angle" is now computed. In this instance, the holding path arrival angle is merely a representation of the time at which the aircraft flying along the radial path intersects the holding path cone at the assigned altitude. Unit 103 therefore computes the holding path arrival angle, $\alpha$, according to the manner described previously herein and transfers the computed result data word to register GR–18.

The data word contents of register GR–16 are next transferred to Unit 103, the most significant bit of the data word is changed to a binary 1 and the remaining bits are changed to binary 0's, and the result data word is transferred back to register GR–16. Therefore, although the instant computed course has not yet been tested for safety, it is momentarily assumed safe and a binary 1 is inserted in the check bit position of the data word in register GR–16.

The azimuth-altitude data word and the range data word, which have been previously retrieved from the Memory Unit and stored in respective ones of registers 107, are now transferred to and replace the contents of the respective registers GR–17 and GR–19.

Unit 103 of the Main Computer next prepares the aforementioned auxiliary instruction having a binary 1 in the second bit position and transfers the instruction to register GR–20.

The set of course constants represented in the third line of page 7 as now occupying registers GR–16 to GR–20 comprises the set of output data words to be provided by the Main Computer in the present instance. These data words are transferred to Buffer Register 66 to Control Unit 44, and through registers 66 and 65 to Auxiliary Computer 41. Additionally, the contents of registers GR–16 to GR–19 are transferred to Memory Unit 42 and inserted into the drum sectors storing history data for the corresponding aircraft.

Main Computer 40 now has completed its processing interval for the data group last received thereby from Aircraft Communicator 15. The data group received comprised the second data group for the newly acquired aircraft. In response to this second data group, the Main Computer tested the scheduled gate number for this aircraft during the processing interval. If the gate number was unchanged from the ideal value the previously computed ideal course was transferred to the Auxiliary Computer to provide for testing the safety of the course. On the other hand, if the scheduled gate number was a result of a modification of the ideal gate number, the previously computed ideal course was adjusted to compensate for the required delay in arrival time. The adjusted course was thereupon transferred to the Auxiliary Computer to provide for testing the safety of the course. Main Computer 40 then becomes ready to accept the next-awaiting data group if one is stored in the Control Unit.

Upon receipt of the computed course constant set from the Main Computer, the Auxiliary Computer transfers the course constant data words into respective ones of registers 157–160. For example, the holding path dwell angle data word is transferred into register 160, the azimuth-altitude data word is transferred into register 159, the holding path arrival angle data word is transferred into register 158 and the range data is transferred into register 158 and the range data word is transferred into register 157. The auxiliary instruction is transferred through register 157 and into Command Register and Decoder 155. Additionally, the Control Unit at this time transfers the corresponding aircraft identifier from register 63 through register 65 and into a temporary storage register, not show, of the Auxiliary Computer, such as an accumulator.

The auxiliary instruction now in Command REgister and Decoder 155 controls the Auxiliary Computer to perform a data processing task for determining whether the computed course is safe and, therefore, valid. If the computed course is determined not to be safe, the auxiliary computer provides a notification to the Main Computer to control the Main Computer to subsequently modify the course. The safety of the course represented in registers 157–160 is determined by comparing the related course constants against corresponding course constants of each course constant set for all previously scheduled safe courses of other aircraft presently being controlled by the System. The result set of the comparisons made with each safe course determines whether the course being tested represents a present or potential conflict with the safe course and is to be considered unsafe.

the course constants of all safe courses are stored in a set of tracks on the portion of drum 75 directly accessible by the Auxiliary Computer. The data words of each course constant set are stored in a set of successively accessible sectors in the same track. The course constant sets are stored in these tracks in sequential sector sets having initial addresses corresponding to the related aircraft identifier numbers.

As each safe course i retrieved from the Memory Unit by the Auxiliary Computer, the course constants are compared with corresponding constants of the test course; i.e., the course under test and defined by the course constants stored in registers 157–160. Four comparisons are made using the test course constants as each safe course is retrieved. The aggregate of the results of the four comparisons define a test result set.

Each test result set is matched with several criteria of unsafeness. If any one of these criteria is met by a test result set, the test course is considered unsafe and the course check operation terminates. The most significant bit of the holding path dwell angle data word in register 160 is thereupon changed in a binary 0 to denote an unsafe course and the data word is transferred to the Control Unit for storage in the appropriate location of the history data sectors of the Memory Unit.

On the other hand, if no criterion of unsafeness is met by a test result set, the next sequential safe course is retrieved from the Memory Unit and compared with the test course constants. If no conflict with any safe course is found after the test course has been compared with all safe courses, the course check operation terminates. The most significant bit of the dwell angle data word remains unchanged as a binary 1, denoting that the test course is safe and has been assigned to the related aircraft. The Auxiliary Computer thereupon transfers the test course data words to the drum portion directly accessible by the Auxiliary Computer, employing the stored aircraft identifier to provide the address of the proper sector set for insertion of the new course constants.

The detailed mechanism of the course check operation will now be described. The following four course constants of the test course are employed in the course check operation: the azimuth stored in register 159 and designated $\Gamma_0$ in the test equations below; the altitude, stored in register 159, and designated $A_0$ below; the holding path arrival angle, stored in register 158 and designated $\alpha_0$ below; and the range, stored in register 157 and designated $r_0$ below. The sequential course comparison function is initiated when Arithmetic Unit 151 is controlled by Controller 150 to transmit the address of the first cell of the sector sequence storing the course constants to Address REgister 83 of the Memory Unit. This first cell address may be, for example, the number 0. Control signals are also provided by Controller 150 to Drum Memory Controller 80 to control the sequential retrieval of the course constants. In effecting this sequential retrieval, Augmenter 85 repeatedly increments the original address entered into Address Register 83. Each course constant, when retrieved and entered into Data Register 84 of the Memory Unit is immediately transferred to the Auxiliary Computer and applied into one input terminal of Comparator 151. The constants of each safe scheduled course are retrieved from drum 75 in the sequential order in which they are to be compared with the test course constants. For example, according to one embodiment of the instant invention, the azimuth-altitude data word for a safe course is first retrieved, followed next by retrieval of the holding path arrival angle data word, and then followed by retrieval of the range data word.

As each safe course constant is applied to a terminal of Comparator 151, Controller 150 transfers the corresponding test course constant to the other terminal of the Comparator, whereby each safe course constant is immediately compared with the corresponding test course constant. The result of each such comparison is evidenced by signals, not shown, which may be temporarily stored in Comparator and Arithmetic Unit 151, according to the instant embodiment, or in an additional register or accumulator of the Auxiliary Computer, not shown. When the four comparisons of the constants of a scheduled course with the constants of the test course have been completed, the four results comprise the aforementioned test result set, this set now being stored in Comparator and Arithmetic Unit 151.

The four comparison subsequence for each retrieved scheduled course is initiated when Controller 150 transfers the test azimuth-altitude data word from register 159 to Comparator 151 at the same time that the altitude data word of the scheduled course is being retrieved from the Memory Unit and applied to the Comparator. The test altitude is immediately compared with the scheduled altitude and the test azimuth with the scheduled azimuth by a pair of successive subtraction operations. The difference, $A_R$, provided by subtracting the scheduled altitude, $A_k$, from the test altitude, $A_0$, is represented by the equation:

$$A_0-A_k=A_R \quad (1)$$

The difference result, $A_R$, is thereupon stored by Comparator and Arithmetic Unit 151 as a single binary digit, the value of this binary digit representing whether $A_R$ is equal to 0 or is not equal to 0. Thus, the result obtained by comparing the test and scheduled altitudes is stored as an indication of whether the two altitudes are the same.

The difference, $r_R$, provided by subtracting the scheduled azimuth, $\Gamma_k$, from the test azimuth, $\Gamma_0$, is represented by the equation:

$$\Gamma_0-\Gamma_k=\Gamma_R \quad (2)$$

The difference result, $\Gamma_R$, is thereupon stored in Unit 151 as a single binary digit, the value of this binary digit representing whether $\Gamma_R$ is equal to 0 or is not equal to 0. Thus, the result obtained by comparing the test and scheduled azimuths is stored as an indication of whether the two azimuths are the same.

Controller 150 next transfers the test holding path arrival angle data word from register 158 to Comparator 151 at the same time that the holding path arrival angle data word of the scheduled course is being retrieved from the Memory Unit and applied to the Comparator. The test arrival angle is immediately compared with the scheduled arrival angle by a subtraction operation. The difference $\alpha_R$, provided by subtracting the scheduled arrival angle, $\alpha_k$, from the test arrival angle, $\alpha_0$, is represented by the equation:

$$\alpha_0-\alpha_k=\alpha_R \quad (3)$$

The difference result, $\alpha_R$, is thereupon stored by Unit 151 as a single binary digit, the value of this binary digit representing whether $\alpha_R$ is equal to 0 or is not equal to 0. Thus, the result obtained by comparing the test and scheduled holding path arrival angles is stored as an indication of whether the two arrival angles are the same.

The last comparison of the subsequence occurs when Controller 150 transfers the test range data word from register 157 to Comparator 151 at the same time that the range data word of the scheduled course is being retrieved from the Memory Unit and applied to the Comparator. The test range is immediately compared with the scheduled range by a subtraction operation. The difference, $r_R$, provided by subtracting the scheduled range, $r_k$, from the test range, $r_0$, is represented by the equation:

$$r_0-r_k=r_R \quad (4)$$

The difference result, $r_R$, is thereupon stored by Unit 151 as a single binary digit, the value of this binary digit representing whether the absolute value of $r_R$ is less than a predetermined value or is not less than 16 miles or is not less than 16 miles. Thus, the result obtained by comparing the test and scheduled ranges is stored as an indication of whether the two ranges are separated by less than a predetermined distance.

Immediately after the complete test result set, representing the above-described four comparisons, has been stored in Unit 151, Controller 150 provides for comparing the result set against several data elements representing predetermined criteria of unsafeness. These criterion data elements may be stored in the Auxiliary Computer in registers not shown, or may be retrieved from the Memory Unit at this time. Only three of these criteria of unsafeness will be described herein, although additional criteria are employed to insure safeness of the entire computed test course.

A first unsafeness criterion data element is provided to warn that the newly acquired aircraft will immediately be flying too close to an already scheduled aircraft, if the newly acquired aircraft flies the test course represented in registers 157–160. Controller 150 directs a comparison of the result set in Unit 151 with this criterion data element. The result set and the data element compare as equal if $A_R$ equals 0, $\Gamma_R$ equals 0, and $r_R$ is less than 16 miles. Thus, an affirmative comparison is effected, indicating that the test course is unsafe, provided that the test course requires an aircraft to fly on the same radial path and at the same altitude as a scheduled aircraft, if the distance between the two aircraft is presently insufficient.

A second unsafeness criterion data element is provided to warn that the newly acquired aircraft subsequently will pass the scheduled aircraft on the same radial path and at the same altitude, if the newly acquired aircraft flies the test course represented in registers 157–160. Controller 150 directs a comparison of the result set in Unit 151 with this criterion data element. The result set and the data element compare as equal if $A_R$ equals 0, $\Gamma_R$ equals 0, $r_R$ is greater than 0, and $\alpha_R$ is less than 0. Thus, an affirmative comparison is effected, indicating that the test course is unsafe, provided that the test course requires a newly acquired aircraft to fly on the same radial path and at the same altitude as a scheduled aircraft, if the newly acquired aircraft is presently at a greater range than the scheduled aircraft but will arrive at the holding path cone at an earlier time and, therefore, must pass the scheduled aircraft.

A third unsafeness criterion data element is provided to warn that a scheduled aircraft subsequently will pass the newly acquired aircraft on the same radial path and at the same altitude, if the newly acquired aircraft flies the test course represented in registers 157–160. Controller 150 directs the comparison of the result set in Unit 151 with this criterion data element. The result set and the data element compare as equal if $A_R$ equals 0, $\Gamma_R$ equals 0, $r_R$ is less than 0, and $\alpha_R$ is greater than 0. Thus, an affirmative comparison is effected, indicating that the test course is unsafe, provided that the test course requires a newly acquired aircraft to fly on the same radial path and at the same altitude as a scheduled aircraft, if the scheduled aircraft is presently at a greater range than the newly acquired aircraft but will arrive at the holding path cone at an earlier time and, therefore, must pass the newly acquired aircraft.

If any unsafeness criterion is determined to match a test result set the course check operation immediately terminates, since the test course conflicts with at least one scheduled course and is thereby considered unsafe. The test dwell angle data word in register 160 is transferred to Arithmetic Unit 151, the most significant bit thereof is changed to a binary 0 to denote an unsafe course, and the data word is transferred back to register 160. The auxiliary Computer thereupon transfers the dwell angle data word in register 160 and the corresponding aircraft identifier word through Buffer Register 62 of the Control Unit to the Memory Unit. The dwell angle data word is then inserted into a cell of the history data sectors of drum 75 which correspond to the identified aircraft, utilizing a method similar to that described previously.

If no unsafeness criterion is determined to match a test result set the next sequential scheduled course constant set is retrieved from the Memory Unit and compared with the test course constants. If no conflict with any safe course is found after the test course has been compared with all scheduled courses, the test course sequential course check operation is concluded. The most significant bit of the dwell angle data word in register 160 is continued as a binary 1 to denote that the corresponding course is safe. The test course then becomes a scheduled course. The Auxiliary Computer thereupon transfers the test course constant set in registers 157–160 to the Memory Unit for storage in a sequential sector set of drum 75 directly accessible by the Auxiliary Computer. Storage of the new scheduled course constants in the proper four successive sectors of the Memory Unit is effected by first transferring the corresponding aircraft identifier to Address Register 83 of the Memory Unit and then transferring the four course constant data words in succession from registers 160, 159, 158 and 157 through Arithmetic Unit 151 to Data Register 84 for insertion into the sequential sector set of drum 75 corresponding to the identified aircraft.

Upon completion of the instant computation interval, the Auxiliary Computer is ready to accept other processing tasks or to perform the previously mentioned routine processing operations.

Upon receipt of the third radiofrequency data group signals for the recently acquired aircraft from Communicator 15, the System is ready to continue the immediate and direct data processing tasks required for the aircraft. The data group, as before, comprises five data words which represent the aircraft identifier, the current aircraft position, and aircraft status information. The status data word again includes a representation that data has been transmitted previously with respect to this aircraft in its present approach.

When Main Computer 40 is ready, it receives and transfers the binary digital represented position and status words into registers GR–18 to GR–21; FIG. 5 and FIG. 7, first line. Control Unit 44 next controls the retrieval of the stored characteristics and course history of the aircraft from Memory Unit 42. The characteristics and course history are received by Main Computer 40 and inserted into various ones of registers 107. The course history data words now comprise the previously computed course, which includes azimuth and altitude; the most recently updated scheduled range; the scheduled gate number $N_G$; a holding path arrival angle; and, for some aircraft, a holding path dwell angle.

The retrieved scheduled gate number is inserted into register GR–17. The remaining retrieved history data words are inserted into respective ones of registers GR–1 to GR–15. Again, the optimum speed characteristic, $V_C$, for the aircraft is inserted into register GR–16.

A succeeding instruction received by Command Register and Decoder 101 from the Memory Unit controls the transfer of the status word contents of register GR–21 to Arithmetic and Logic Unit 103 and back to register GR–21. Logic Unit 103 senses the status word to determine aircraft status and, in particular, to determine whether a previous data group has been provided for the aircraft. In this instance, the least significant bit of the status word is a binary 0, whereupon the Main Computer, upon sensing this bit, transfers the history condition data word from the one of registers 107 in which it is stored to Unit 103. In this instance the history condition word denotes that the Main Computer has performed data-processing tasks during two processing intervals for the related aircraft, and, therefore, a course check has been performed by the Auxiliary Computer for this aircraft. Upon sensing the instant history condition data word, the Main Computer next prepares to test the gate number data word.

The contents of register GR–17 next are transferred through Unit 103 and back to register GR–17. Logic Unit 103 senses the gate number data word to determine the value of the gate validity bit thereof. If the gate validity bit is a binary 0, the scheduled gate number has been modified from the previously computed gate number, and the previously computed course must be modified to correspond to the modified scheduled arrival time. The modification of the previously computed course to correspond to the present gate number is effected in the manner described previously herein. The modified course is then sent to the Auxiliary Computer to provide for testing the safety thereof.

If, however, the gate validity bit is a binary 1, the scheduled gate number is the same as the previously computed gate number and corresponds to the previously computed course. The contents of the one of registers 107 storing the holding path dwell angle data word thereupon is transferred to Arithmetic and Logic Unit 103, and the check bit of the data word is sampled to determine whether the corresponding course is safe. If the check bit is a binary 0, denoting an unsafe course, the course must be modified to avoid conflict with the previously scheduled courses. If the check bit is a binary 1, denoting a safe course, the Main Computer will now develop control data for directing the corresponding aircraft to follow the course.

In the instance wherein the scheduled gate number corresponds to the previously computed course, but the course has been denoted as unsafe, a first modification in the course is made as a first effort to avoid conflict with the set of previously scheduled courses. According to one form of course modification, either the azimuth or the altitude course constant is altered to the next allowable value. For example, if the altitude of the conflicting course is 36,000 feet, it may be modified to 32,000 feet or to the next level allowable for the aircraft involved. In effecting this course modification, the azimuth-altitude data word is transferred from the one of registers 107 in which it has been stored to Unit 103, whereupon unit 103 modifies the altitude level represented by the data word to the next allowable level for the aircraft and returns the data word to registers 107.

The Main Computer thereupon employs the new altitude, the gate number, the optimum speed, and the updated range to recompute the value of the holding path arrival angle and the value of the holding path dwell angle, if the latter value is required. The check bit in the holding path dwell angle data word is restored to represent a binary 1 at this time. The previously described auxiliary instruction for controlling the Auxiliary Computer to perform a safety test on the recomputed course is next prepared. The course constants of the recomputed course are thereupon transmitted to the Auxiliary Computer, along with the auxiliary instruction, to determine whether the recomputed course continues to conflict with the set of scheduled courses. Although the instant course recomputation eliminates the previous conflict with a particular scheduled course, the recomputed course may now conflict with a different scheduled course.

The recomputed course is also inserted into the Memory Unit drum sectors storing history data for the corresponding aircraft.

In the instance wherein the scheduled gate number corresponds to the previously computed course and the course has been denoted as safe, the Main Computer next develops control data for directing the aircraft to follow the course. The control data to be developed comprises aircraft heading, air speed and altitude data words. The control data also comprises an aircraft command control word, which includes momentary command information required for the aircraft to reach the scheduled course.

The heading and altitude control data words are developed by transferring to Unit 103 the azimuth-altitude course data word from the one of registers 107 in which it has been stored. If the current wind velocity is not significant, the aircraft heading is directly opposite to the aircraft azimuth with respect to the carrier; therefore, Unit 103 adds 180° to the azimuth value to provide a basic heading value. If wind direction and speed have previously been entered into the Memory Unit by manual insertion from Control Console 45, these wind values are now in registers 107 and they must be considered in the heading. Accordingly, the basic heading value is adjusted by Unit 103 in accordance with the wind velocity to provide the required heading for the aircraft to fly along the assigned radial path. The heading control word, which comprises either the basic heading value or the adjusted value, is now transferred as an individual control word from Unit 103 to another one of registers 107.

The speed control data word is developed by transferring to Unit 103 the optimum speed contents of register GR–16. The optimum speed value is adjusted by Unit 103 in accordance with the stored wind velocity data to provide the required air speed for the aircraft to fly along the assigned radial path. The speed control word is then transferred from Unit 103 to register GR–16.

The command data word may now be developed by comparing certain of the aircraft positional data with the corresponding assigned course constants. For example, the azimuth-altitude course data word may be transferred to one input terminal of Unit 103 from the one of registers 107 in which it has been stored. At this time, the altitude contents of register GR–18 and the bearing contents of register GR–20 are transferred successively to the other input terminal of Unit 103. Arithmetic Unit 103 thereupon performs two successive subtraction operations, first subtracting the aircraft bearing from the course azimuth. The two difference results are transferred from Unit 103 to respective ones of accumulators 104 and 105. These difference results are then returned in succession to Unit 103, which senses the respective magnitudes and signs of the two different values. If the magnitude of a difference value is greater than a respective predetermined value, a binary indication of the sign of the difference value is temporarily stored in Unit 103. For example, if the aircraft is currently flying more than a predetermined distance above or below the required course altitude, one of two binary indicators in Unit 103 is set to denote that the aircraft is either too far above or too far below the course altitude. Similarly, a pair of indicators in Unit 103 denotes that the aircraft is flying either too distant clockwise or too distant counterclockwise from the assigned radial path.

Unit 103 utilizes this stored binary information for generating the command data word, respective bits of which comprise information relative to the deviation of the aircraft from the assigned course. For example, one bit of the command data word, such as the least significant bit, may be set to a binary 1 to indicate that the aircraft is too far above the assigned altitude and, therefore, must immediately descend. Similarly, another bit, such as the sixth bit of the command word, may indicate that the aircraft is too far to the left of the assigned radial path, and, therefore, must immediately turn right.

Following its generation, the command data word is transferred from Unit 103 to register GR-19. The heading and altitude control data words are then retrieved from registers 107 and transferred to respective ones of registers GR-17 and GR-18. The information represented in the last line of FIG. 7 as now occupying registers GR-16 to GR-19 comprises the next set of output data words to be provided by the Main Computer for a newly acquired aircraft. Therefore, the data word contents of registers GR-16 to GR-19 are next transferred to Buffer Register 66 of the Control Unit, and through registers 66 and 65 into respective ones of registers 67, 68, 69, and 70. The Control Unit then transfers the aircraft identifier from register 63 to register 65.

Main Computer 40 now has completed its processing interval for the data group last received thereby from Aircraft Communicator 15 and is ready to receive the next-awaiting data group, if one is stored in registers 55 and 58-60 of the Control Unit.

At this time, if Main Computer 40 has generated control data for an aircraft, registers 65 and 67-70 of the Control Unit contain the corresponding aircraft identifier and the control data group. When Transmitter 52 is ready to transmit radio frequency signals representing the control data group to Aircraft Communicator 15, the aircraft identifier in register 65 is first transferred to Transmitter 52. Next the data words in register 67-70 are transferred in succession through register 65 to Transmitter 52. Transmitter 52 translates the binary digital signals received from register 65 into corresponding radiofrequency signals, and transmits the radiofrequency signals to Aircraft Communicator 15 for retransmission to the identified aircraft.

Upon receipt of each radiofrequency data group for an aircraft following the transmission of the first control data group to the aircraft, the Main Computer is controlled to repeat one or more of the previously described functions. Main Computer 40 again retrieves the course history and characteristics of the aircraft from the Memory Unit and then tests the aircraft status word to determine whether a previous data group has been provided for the aircraft. The least significant bit of the status word is a binary 0 at this time, whereupon the Main Computer tests the retrieved history condition data word. In this instance, the history condition data word. In this instance, the history condition data word denotes that the Main Computer has previously generated a course control data group for the respective aircraft. Accordingly, the Main Computer next prepares to test the gate number data word.

If the validity bit of the gate number data word is a binary 0, denoting that the Auxiliary Computer has modified the gate number to accommodate the required ideal course for a later acquired priority aircraft, the corresponding computed course must be modified to provide for the modified arrival time. Accordingly, the course for the instant aircraft is modified as described heretofore and transmitted to the Auxiliary Computer to provide for testing the safety thereof. If the validity bit of the gate number data word is a binary 1, denoting that the gate number is the same as the previously computed gate number and corresponds to the previously computed course, the Main Computer next tests the holding path dwell angle data word.

If the check bit of the dwell angle data word is a binary 0, denoting unsafe course, the course must be modified to avoid conflict with the other scheduled courses. Accordingly, the course is modified as described heretofore and again transmitted to the Auxiliary Computer to provide for testing the safety thereof. If the check bit of the dwell angle data word now is a binary 1, denoting a safe course, the Main Computer will regenerate the control data for directing the corresponding aircraft to follow the course.

After the control data has been computed, the aircraft command data word is developed to correspond to any significant deviations of the aircraft from the scheduled course. Accordingly, as described theretofore, the scheduled course azimuth and altitude values are compared with the respective aircraft bearing and altitude. From these comparisons, the appropriate bits of the command data word are set if one or more substantial deviations from the scheduled course are detected. Additionally, at this time, the updated scheduled range history data word is compared with the current aircraft range. If the magnitude of the difference between scheduled range and actual range is greater than a predetermined value, a binary indication of the sign of the difference is inserted into one of two bits of the command data word to indicate that the aircraft is either too far behind or too far ahead of its time schedule and, therefore, that the aircraft must either increase or decrease its speed.

Following generation of the command data word the completed control data group is transferred to the Control Unit for transmission to the aircraft. Thus, the aircraft continually receives current control data and commands providing information for the aircraft to fly on the course computed and scheduled by the Multicomputer System.

Accordingly, there has been described herein a novel multicomputer system for satisfying the data-processing requirements of a real-time environment. The plural data processors provided satisfy these requirements by executing separate programs simultaneously. A first of these processors has the primary function of accepting and processing the positional data received from each of the aircrafts of the real-time environment to compute a course for the aircraft to follow and to generate control data for directing the aircraft to follow the computed course. A second of these data processors has the primary function of performing ancillary data-processing tasks necessary to support the independent processing tasks provided by the first processor, these ancillary data processing tasks including rescheduling an aircraft where the arrival time thereof conflicts with that of another aircraft and performing course checks to determine the safety of the computed courses. For coordinating the operation of the complete multicomputer system, the first processor generates program instructions to control the second processor to perform selected ones of the ancillary tasks. Upon performance of the ancillary tasks, the second processor provides indicia to the first processor to denote the consequences of these ancillary tasks. The first processor thereupon responds to these indicia to provide its next processing tasks. Accordingly, an improved and efficient data-processing system for operating in a real-time environment is described herein.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A data-processing system comprising: a plurality of data processors, each of said processors being adapted to receive data words, to execute a plurality of different processing operations on received data words in response to a corresponding plurality of data words representing instructions, and to generate data words representing the processed results of said operations; a data storage unit for storing a plurality of data words in respective ones of a plurality of storage locations; and a data storage controller for coupling all of said processors to said data storage unit, said data storage controller providing access to said storage locations for all of said processors to enable all of said processors simultaneously to retrieve data words from respective ones of said storage locations or to insert said generated data words into respective ones of said locations.

2. The data-processing system of claim 1, wherein said data storage controller further comprises means for enabling one of said processors to retrieve a data word from the one of said locations into which another one of said processors has previously inserted one of said generated data words.

3. A data-processing system comprising: a plurality of data processors, each of said processors being adapted to receive data words, to execute a plurality of different processing operations on received data words in response to a corresponding plurality of data words representing instructions, and to generate data words representing the processed results of said operations; a first of said processors being responsive to a particular set of said instructions to generate a data word representing control information for another one of said processors; a data storage unit for storing a plurality of data words in respective ones of a plurality of storage locations; and a data storage controller for coupling all of said processors to said data storage unit, said data storage controller providing access to said storage locations for all of said processors to enable all of said processors simultaneously to retrieve data words from respective ones of said storage locations or to insert said generated data words into respective ones of said locations; said storage controller further comprising means for enabling a second of said processors to retrieve said control data word generated by said first processor; said second processor being responsive to the control data word retrieved thereby for performing a corresponding data-processing operation.

4. For providing the data-processing requirements of a complex of interrelated members, the data-processing system comprising: first and second data processors, each of said processors being adapted to receive data words, to execute a plurality of different processing operations on received data words in response to a corresponding plurality of data words representing instructions, and to generate data words representing the processed results of said operations; means for transferring first data word groups representing information relating to respective ones of said members to said first processor; control means for transferring a first sequence of instructions to said first processor for controlling said first processor to perform a data processing function for each of said first data word groups independently of the information represented by the others of said first data word groups; means for transferring second data word groups comprising at least one data word and representing additional information relating to respective ones of said members to said second processor; said control means transferring a second sequence of instructions to said second processor for controlling said second processor to perform a data processing function for each of said second data word groups in accordance with the information represented by others of said second groups.

5. For providing the data-processing requirements of a complex of interrelated members, the data-processing system comprising: first and second data processors, each of said processors being adapted to receive data words, to execute a plurality of different processing operations on received data words in response to a corresponding plurality of data words representing instructions, and to generate data words representing the processed results of said operations; means for transferring first data word groups representing information relating to respective ones of said members to said first processor; control means for transferring a first sequence of instructions to said first processor for controlling said first processor to perform a data-processing function for each of said first data word groups independently of the information represented by the others of said first data word groups, to generate result data words representing the processed results of each said data processing functions, and to generate control data words representing instructions for said second processor; means for transferring said result and control data words to said second processor; said second processor being responsive to each of said control data words to perform a data-processing function for each of said result data words in accordance with the information represented by others of said result data words.

6. For providing the data-processing requirements of a complex of interrelated members, the data-processing system comprising: first and second data processors, each of said processors being adapted to receive data words, to execute a plurality of different processing operations on received data words in response to a corresponding plurality of data words representing instructions, and to generate data words representing the processed results of said operations; means for transferring first data word groups representing information relating to respective ones of said members to said first processor; control means for transferring a first sequence of instructions to said first processor for controlling said first processor to perform a data-processing function for each of said first data word groups independently of the information represented by the others of said first data word groups, to generate result data words representing the processed results of each of said data-processing functions, and to generate control data words representing instructions for said second processor; means for transferring said result and control data words to said second processor; said second processor being responsive to each of said control data words to determine whether each one of said result data words bears a predetermined relationship to others of said result data words and to deliver a signal denoting whether said relationship is found; said second processor comprising means responsive to said signal for modifying said result data word to provide said relationship.

7. For providing the data-processing requirements of a complex of interrelated members, the data-processing system comprising: first and second data processors, each of said processors being adapted to receive data words, to execute a plurality of different processing operations on received data words in response to a corresponding plurality of data words representing instructions, and to generate data words representing instructions, and to generate data words representing the processed results of said operations; means for transferring first data word groups representing information relating to respective ones of said members to said first processor; control means for transferring a first sequence of instructions to said first processor for controlling said first processor to perform a data-processing function for each of said first data word groups independently of the information represented by the others of said first data word groups, to generate result data words representing the processed results of each of said data processing functions, and to generate control data words representing instructions for said second processor; means for transferring said result and control data words to said second processor; said second processor being responsive to each of said control data words to determine whether each one of said result data words bears a predetermined relationship to others of said result data words and to deliver a signal denoting whether said relationship is found; and means for transferring said signal to said first processor.

8. The data-processing system of claim 7 wherein said first processor further includes means responsive to said signal for controlling said first processor to generate a result data word differing from the one of said result data words satisfying said predetermined relationship.